(12) United States Patent
Przechocki et al.

(10) Patent No.: US 11,068,991 B2
(45) Date of Patent: Jul. 20, 2021

(54) CLOSED-LOOP SYSTEM INCORPORATING RISK ANALYTIC ALGORITHM

(71) Applicant: Hartford Fire Insurance Company, Hartford, CT (US)

(72) Inventors: Joseph M. Przechocki, Westfield, MA (US); Evan Van Dam, Manchester, CT (US); James A. Madison, Windsor, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 133 days.

(21) Appl. No.: 15/844,830

(22) Filed: Dec. 18, 2017

(65) Prior Publication Data

US 2019/0188797 A1    Jun. 20, 2019

(51) Int. Cl.
  *G06Q 40/08* (2012.01)
  *H04L 29/08* (2006.01)
  *G06N 20/00* (2019.01)

(52) U.S. Cl.
  CPC ............ *G06Q 40/08* (2013.01); *G06N 20/00* (2019.01); *H04L 67/12* (2013.01); *H04L 67/125* (2013.01)

(58) Field of Classification Search
  USPC .......................................................... 705/4
  See application file for complete search history.

(56) References Cited

U.S. PATENT DOCUMENTS

| | | | |
|---|---|---|---|
| 7,574,896 B1* | 8/2009 | Cooper ............... | G01M 3/2815 73/40.5 R |
| 7,610,210 B2 | 10/2009 | Helitzer et al. | |
| 8,359,211 B2 | 1/2013 | English et al. | |
| 8,731,975 B2 | 5/2014 | English et al. | |
| 8,756,085 B1* | 6/2014 | Plummer ............... | G06Q 40/08 705/4 |
| 9,283,681 B2* | 3/2016 | Slawinski ............... | E04D 15/02 |
| 9,705,695 B1 | 7/2017 | Brandman et al. | |
| 9,824,398 B2 | 11/2017 | English et al. | |
| 10,697,848 B1* | 6/2020 | Dobbs .................. | F04D 15/0088 |
| 2009/0265193 A1* | 10/2009 | Collins .............. | G06Q 30/0185 705/4 |

(Continued)

FOREIGN PATENT DOCUMENTS

WO    WO-2016118979 A2 *  7/2016    ............. H04L 67/02

*Primary Examiner* — Narayanswamy Subramanian
*Assistant Examiner* — Paul S Schwarzenberg
(74) *Attorney, Agent, or Firm* — Buckley, Maschoff & Talwalkar LLC

(57) ABSTRACT

According to some embodiments, a risk monitoring data store may contain a set of electronic data records, with each electronic data record being associated with a stream of sensor data received via a communication network from a remote set of sensor systems located at a risk monitoring site. A risk analytics platform computer may receive information associated with the sensor data in substantially real-time and analyze the received sensor data, using at least one risk analytics algorithm, to detect an abnormal pattern associated with a predicted elevated level of risk at the risk monitoring site. The risk analytics platform computer may also automatically transmit a result of the analysis to a risk operations platform. The risk operations platform may then implement an active risk mitigation adjustment at the risk monitoring site responsive to the result of the analysis.

14 Claims, 18 Drawing Sheets

(56) References Cited

U.S. PATENT DOCUMENTS

| | | | |
|---|---|---|---|
| 2016/0163177 A1* | 6/2016 | Klicpera | G08B 21/18 |
| | | | 137/59 |
| 2016/0253761 A1 | 9/2016 | Davey et al. | |
| 2017/0091871 A1* | 3/2017 | Trainor | G06Q 40/08 |
| 2017/0322705 A1* | 11/2017 | Conway | G06Q 40/08 |
| 2019/0314657 A1* | 10/2019 | Hofmann | A62C 3/002 |

* cited by examiner

CLOSED-LOOP SYSTEM INCORPORATING RISK ANALYTIC ALGORITHM

FIELD

The present invention relates to computer platforms and, more particularly, to computer platforms associated with a closed-loop system incorporating a risk analytic algorithm.

BACKGROUND

In some cases, an enterprise might want to analyze, model, and/or predict risk and/or performance values. For example, an insurance company might want to predict a likelihood of imminent physical damage at a particular location (e.g., a building, factory, or construction site) based on a number of different factors. Typically, a user associated with the enterprise may manually define rules and/or logic to implement such predictions. Such an approach, however, can be a time consuming and error-prone process—especially when the logic being implemented for an algorithm is complex and/or a substantial number of factors are associated with the prediction.

It would be desirable to provide systems and methods to accurately and efficiently facilitate predictive risk analytics for an enterprise.

SUMMARY

According to some embodiments, systems, methods, apparatus, computer program code and means may facilitate predictive risk analytics for an enterprise. In some embodiments, a risk monitoring data store may contain a set of electronic data records, with each electronic data record being associated with a stream of sensor data received via a communication network from a remote set of sensor systems located at a risk monitoring site. A risk analytics platform computer may receive information associated with the sensor data in substantially real-time and analyze the received sensor data, using at least one risk analytics algorithm, to detect an abnormal pattern associated with a predicted elevated level of risk at the risk monitoring site. The risk analytics platform computer may also automatically transmit a result of the analysis to a risk operations platform. The risk operations platform may then implement an active risk mitigation adjustment at the risk monitoring site responsive to the result of the analysis.

Some embodiments provide: means for receiving, at a risk analytics platform computer from a risk monitoring data store via a communication network, information associated with a stream of sensor data generated by a remote set of sensor systems located at a risk monitoring site; means for analyzing the received sensor data, using at least one risk analytics algorithm, to detect an abnormal pattern associated with a predicted elevated level of risk at the risk monitoring site; and means for automatically transmitting a result of the analysis to a risk operations platform, wherein the risk operations platform is to implement an active risk mitigation adjustment at the risk monitoring site responsive to the result of the analysis.

A technical effect of some embodiments of the invention is an improved, secure, and computerized method to facilitate predictive risk analytics for an enterprise. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of one or more electronic data record management and deployment by providing benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks and subsystems. For example, in the present invention information may be processed, managed, and/or used to deploy predictive analytic algorithms, such as by deploying and/or using computing components, and results may then be analyzed accurately and used to fine tune the algorithms, thus improving the overall performance of an enterprise (e.g., by improving the effectiveness and/or reducing the number of algorithms that need to be processed via a network and/or communication links). Moreover, embodiments might further improve risk and/or performance values, mitigate physical damage at a remote site, reduce response times, improve resource allocation decisions, etc.

In some cases, an enterprise might want to analyze, model, and/or predict risk and/or performance values. For example, a business might want to predict that damage might soon occur (e.g., damage to an object or person) based on a number of different factors (e.g., physical and/or environmental conditions at a site might monitored). Typically, a user associated with the enterprise (e.g., a data scientist) might manually define rules and/or logic to implement such predictions. Such an approach, however, can be a time consuming and error-prone process.

It would be desirable to provide systems and methods to accurately and efficiently facilitate creation and deployment of predictive risk analytic "algorithms" for an enterprise, while allowing for flexibility and effectiveness when reviewing, monitoring, and/or automatically adjusting algorithms as appropriate. As used herein, the term "algorithm" may refer to, for example, a process or set of rules to be followed in calculations or other problem-solving operations (e.g., by a computer) and/or any coding, software, networking, APIs, predictive models, predictive model metadata, predictive model hyper-parameters, other system components, etc.

Figure 1:
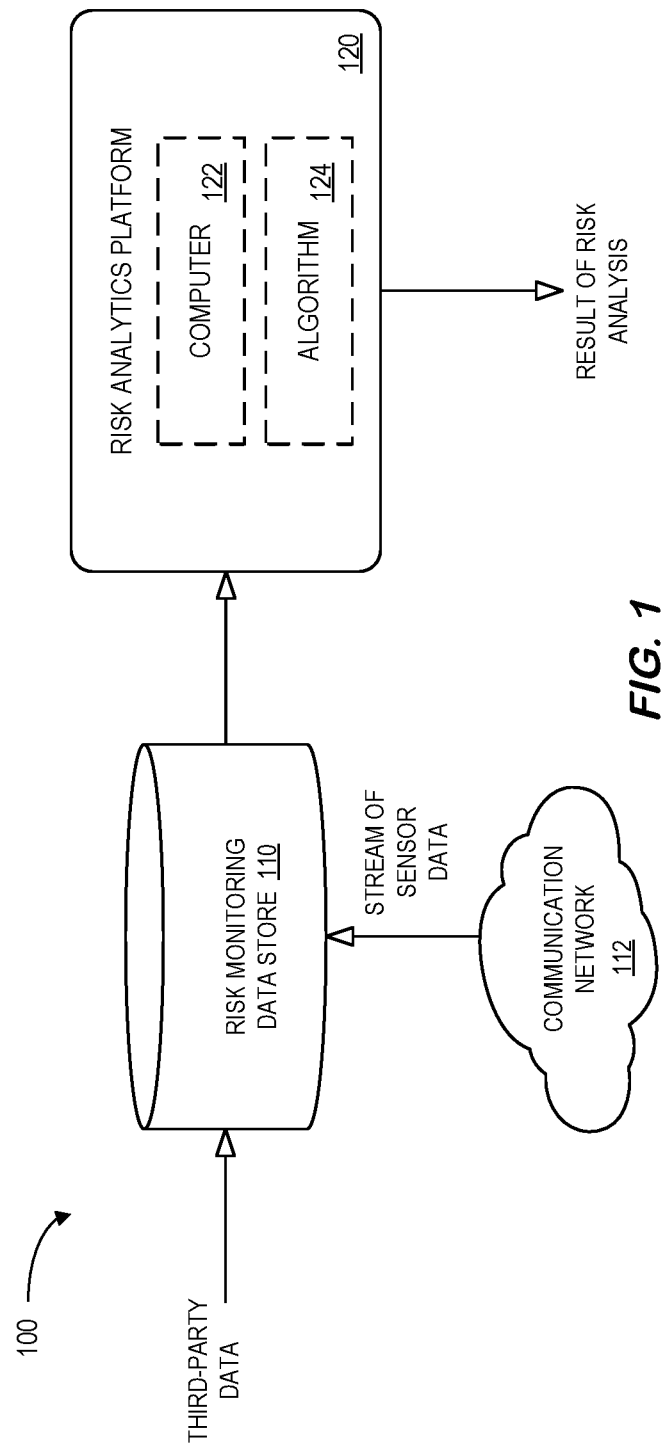
FIG. 1 is a high-level block diagram of an enterprise system according to some embodiments.

FIG. 1 is block diagram of a system 100 wherein a risk monitoring data store 110 collects a stream of sensor data received via a communication network 112. The stream of sensor data might be received, for example, from a remote site being monitored by an enterprise. The stream of sensor data might be supplemented, in some cases, with third-party data (e.g., data received from a weather service, security company, etc.). In some embodiments, the system 100 includes a risk analytics platform 120 that may receive information from the risk monitoring data store 110. Note that the stream of sensor data might be associated with devices located at various locations within a site being monitored.

According to some embodiments, the risk analytics platform 120 utilizes a computer 122 and/or an algorithm 124 to transmit a result of a risk analysis (e.g., to a risk operations platform and/or administrator). For example, a Graphical User Interface ("GUI") or other module of the risk analytics platform 120 might transmit information via the Internet to facilitate a rendering of an interactive graphical operator interface display and/or the creation of electronic alert messages, automatically created site recommendations, etc. According to some embodiments, the risk analytics platform 120 may also store this information in a local database and/or the risk monitoring data store 110.

The risk analytics platform 120 may receive a request for a display from a requestor device. For example, a customer might use his or her smartphone to submit the request to the risk analytics platform 120. Responsive to the request, the risk analytics platform 120 might access information from the risk monitoring data store 110 (e.g., associated with current sensor data or information collected over a period of time). The risk analytics platform 120 may then use the GUI to render operator displays. According to some embodiments, an operator may access secure monitoring information through a validation process that may include a user identifier, password, biometric information, device identifiers, geographic authentication processes, etc.

The risk analytics platform 120 and/or risk monitoring data store 110 might be, for example, associated with a Personal Computer ("PC"), laptop computer, smartphone, an enterprise server, a server farm, and/or a database or similar storage devices. The risk analytics platform 120 and/or risk monitoring data store may, according to some embodiments, be associated with an insurance provider.

One function of the risk monitoring data store 110 may be to collect information from sensors via a wireless Wi-Fi network and then forward that information (or a summary of the information) to the risk analytics platform 120 via the Internet or cellular data network. According to some embodiments, an "automated" risk analytics platform 120 may facilitate the provision of risk analysis results to a risk operations platform and/or an operator. For example, the risk analytics platform 120 may automatically generate and transmit electronic alert messages (e.g., when a dangerous condition is detected) and/or site remediation recommendations (e.g., "water to the fourth floor should be turned off immediately"). As used herein, the term "automated" may refer to, for example, actions that can be performed with little (or no) intervention by a human.

As used herein, devices, including those associated with the risk analytics platform 120 and any other device described herein may exchange information via any communication network 112 which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The risk analytics platform 120 may store information into and/or retrieve information from the risk monitoring data store 110. The risk monitoring data store 110 might be associated with, for example, a customer, a building owner, a leasee, an insurance company, an underwriter, or a claim analyst and might also store data associated with past and current insurance claims (e.g., fire damage loss claims). The risk monitoring data store 110 may be locally stored or reside remote from the risk analytics platform 120. As will be described further below, the risk monitoring data store 110 may be used by the risk analytics platform 120 to generate and/or calculate risk predictions (e.g., associated with the likelihood of imminent loss). Note that in some embodiments, a third-party information service may communicate directly with the risk monitoring data store 110 and/or risk analytics platform 120. According to some embodiments, the risk analytics platform 120 communicates information associated with a simulator and/or a claims system to a remote operator and/or to an automated system, such as by transmitting an electronic file or template to an underwriter device, an insurance agent or analyst platform, an email server, a workflow management system, a predictive model, a map application, etc.

Although a single risk monitoring data store 110 and risk analytics platform 120 are shown in FIG. 1, any number of such devices may be included. Moreover, various devices described herein might be combined according to embodiments of the present invention. For example, in some embodiments, the risk monitoring data store 110, risk analytics platform 120, and/or third-party devices might be co-located and/or may comprise a single apparatus.

Figure 2:
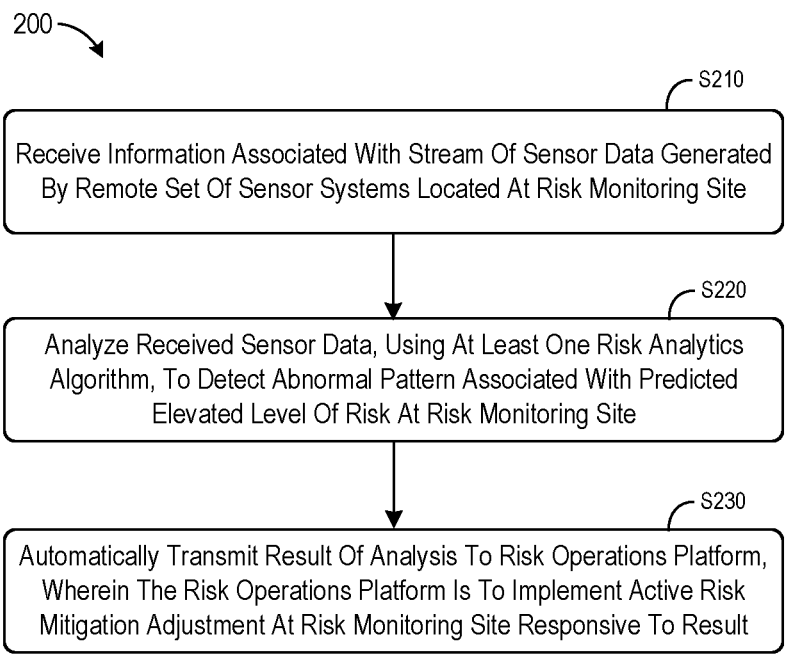
FIG. 2 illustrates an automated predictive risk analytic method according to some embodiments.

Note that the system 100 of FIG. 1 is provided only as an example, and embodiments may be associated with additional elements or components. According to some embodiments, the elements of the system 100 facilitate an exchange of information. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may receive information associated with a stream of sensor data generated by a remote set of sensor systems located at a risk monitoring site. According to some embodiments, the system may also receive historical data, Internet of Things ("IoT") data, information about other risk monitoring sites, third-party data, enterprise transactional system information, etc.

At S220, the system may analyze the received sensor data, using at least one risk analytics algorithm, to detect an abnormal pattern associated with a predicted elevated level of risk at the risk monitoring site. For example, a risk analytics platform computer might execute pattern matching, incorporate a machine learning process, and/or incorporate an artificial intelligence process looking for a deviation from a "normal" signal signature that might indicate an elevated level of risk. As used herein, the term "risk" might be associated with bodily injury (e.g., to a factory worker), electrical damage to equipment, water damage, heat damage (e.g., a machine is overheated), fire damage, vibrational damage, over-use damage, vandalism, intrusion damage, structural damage, environmental damage, a cyber-security threat, etc. According to some embodiments, the system may automatically adjust the risk analytics algorithm based on feedback information to improve the performance of the algorithm.

At S230, the system may automatically transmit a result of the analysis to a risk operations platform. The risk operations platform may then implement an active risk mitigation adjustment at the risk monitoring site responsive to the result of the analysis. For example, the risk operations platform may arrange to shut off electricity, modify operation of a factory, etc. According to some embodiments, the risk operations platform, may incorporate a thresholding process (e.g., has an acceptable level or risk been exceeded), a human verification process, and/or a human intervention process.

Note that the set of sensor systems at the risk monitoring site might include a static sensor (e.g., a thermometer), a mobile robotic sensor (e.g., a robotic sensor that roams around at the site being monitored), a software sensor (e.g., to monitor operation of a computer or network), a vehicle sensor, a drone sensor, a wearable sensor, etc. For example, a security sensor device might include an acoustic sensor (to listen for unexpected sounds), a broken glass detection sensor (looking for simultaneous high frequency and low frequency signals), a thermal sensor (for pattern recognition), a visual light sensor, an infrared sensor (to detect motion based on body heat), a motion sensor, and/or a sonar sensor (to detect motion based on how a sound signal bounces back from an object). A movement sensor device might include a vibration sensor (to detect an earthquake or large equipment malfunction) and/or an accelerometer sensor (to detect a slip and/or fall when the sensor is worn by an employee). A physical damage sensor device might include a water sensor (to detect broken pipes, floods, etc.), a moisture sensor, and/or a vapor sensor (to prevent inhalation of harmful gases). A positioning sensor device might include a gyroscope (to measure orientation and/or displacement of an object), a Global Positioning System ("GPS") satellite sensor (to measure a geographic location), and/or a magnetic sensor. An environmental sensor device might include a temperature sensor (to measure an ambient temperature, prevent freezing water pipes, detect an open door, identify a fire), a particulate sensor, a radioactivity sensor, and/or a voltage sensor (to detect power surges).

Figure 3:
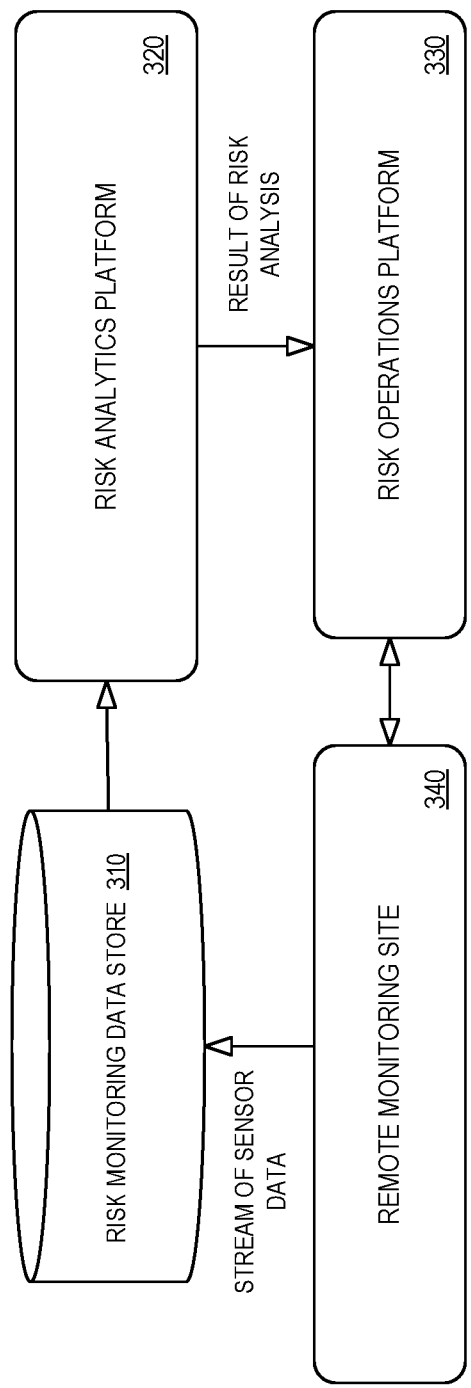
FIG. 3 is a block diagram of a system in accordance with some embodiments.

FIG. 3 is a block diagram of a system 300 in accordance with some embodiments. As before, the system 300 includes a risk monitoring data store 210 that receives a stream of sensor data from a remote monitoring site 340 and provides information to a risk analytics platform 320. The risk monitoring platform 320 may transmit a result of a risk analysis to a risk operations platform 330, which in turn may alter operation of the remote monitoring site 340. Thus, the system 300 may provide a closed-loop data stream and computer instruction code may be exchanged bi-directionally between an insurance company's insurance data platform (risk monitoring data store 310) and insurance analytics platform (risk analytics platform 320). Embodiments may utilize the closed-loop, bi-directional communication of data between an insurance customer's on-premises electronic monitoring and intervention systems (including electronic sensors, robots, and/or a network connection) with other insurance company computer systems (e.g., a data platform and an analytics platform). Moreover, wired and/or wireless network connections for the systems may be used to transmit data bi-directionally, including alerts and other messages to human operators and/or specialists.

For example, an enterprise may want to utilize devices that can monitor an insured object (e.g., premises, vehicles, or workers) to scan for hazards currently in progress or potential hazards avoid bodily injury and/or property damage. Note that hazards might be associated with various types of harm, including those that result in bodily injury, electricity, water, heat/overheating, fire, mechanical/vibration, over-use (a high cycle count), vandalism, intrusion, structural, environmental, etc.

By employing on-premises systems, such as stationary and mobile (robot) sensors, data may be measured and transmitted to an insurance company's risk monitoring data store 310 for storage and processing. The insurance company's risk analytics platform 320 may: (1) employ sophisticated algorithms, including machine learning and artificial intelligence, to review sensor data and historical data (from the insured party, other similar insured parties, and third parties) and determine baseline signatures (i.e., typical or average values per minute and per day) of various types (visual, thermal, acoustic, etc.); and (2) develop algorithms to detect signals outside these baseline signals and upload such algorithms to on-premises computers which, in turn, may be connected to on-premise sensors and robots. According to some embodiments, robots utilizing the customized control algorithms may then initiate mitigation of an impending loss event. As an always-available option, some embodiments may alert a human operator when real-time signals or an algorithm detection exceeds a pre-defined threshold. In this way, the operator may take control of the on-premises sensors and robots to mitigate loss.

According to some embodiments, the on-premises sensors and robots, network and central processing site form an active closed-loop system which can be utilized in a feedback fashion to test, adapt, and improve monitoring and prevention algorithms for a variety of hazards. When a detection occurs, intervention by a pre-programmed robot response or a human intervention may be initiated.

Figure 4:
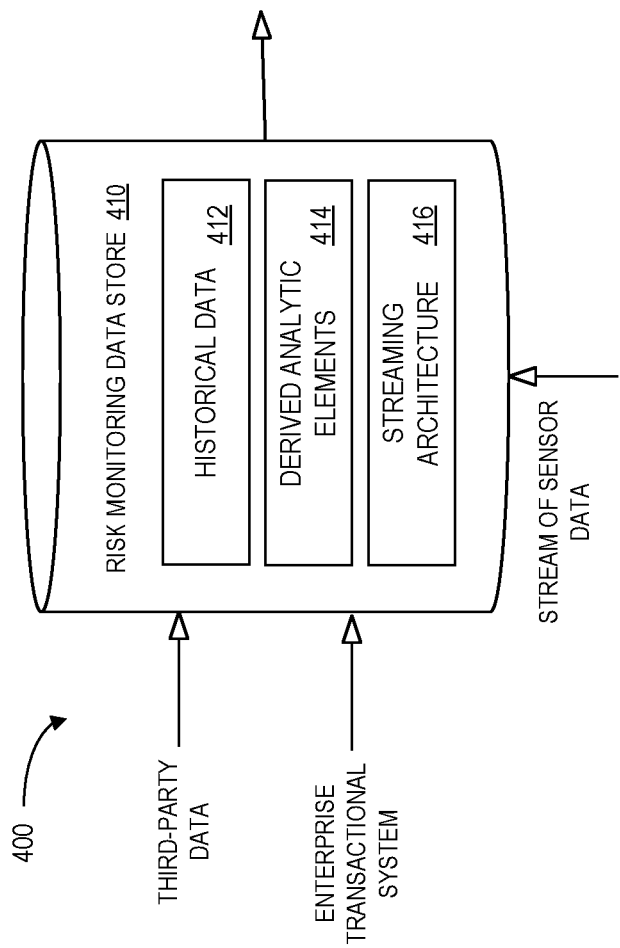
FIG. 4 illustrates a risk monitoring data platform according to some embodiments.

FIG. 4 illustrates a system 400 with a risk monitoring data store 410 according to some embodiments. The risk monitoring data store 410 may receive a stream of sensor data, third-party data, and/or enterprise transactional system information. The risk monitoring data platform 410 may utilize historical data 412, derived analytic elements 414, and/or a streaming architecture 416 to generate information (e.g., to be provided to a risk analytics platform). The a closed-loop architecture of the system 400 may provide sensor input and data input for analysis and real-time or subsequent output to computers that guide sensors. In this way, embodiments may share intelligence across multiple customer-based robotic systems to facilitate comprehensive and actionable pattern matching. The continuous (or frequent) execution of such a closed-loop system may permits artificial intelligence algorithms to learn what data describes typical background signals, to compute responses to atypical signals, and/or to collect feedback to help learn what responses are significant and meaningful.

According to some embodiments, the historical data 412 about all insured objects as well as the derived analytic elements 414 may be generated from machine learning of historical events. The risk monitoring data store 410 may use the streaming architecture 416 to collect streaming data, such as from robots (i.e., mobile sensors), static sensors, wearable sensors, etc. at a customer site. The risk monitoring data store 410 may then work in concert with an analytics platform to provide data for pattern matching, machine learning, and/or risk pattern calculations. The analytics platform may then communicate with an operations service (either at an insurance company or a client site or both) to trigger alarms when values exceeded some value set by a threshold process. When such alarms are triggered, human intervention may be used to take control of the robots remotely, look at the incoming values from multiple sensors, and/or personally investigate any concerns. The analytics platform may then compute new algorithms for the robots to utilize when performing scans—such as by optimizing location search patterns and/or signal detection algorithms. In turn, the cycle repeats with the robots and sensors streaming data back to the risk monitoring data store 410.

Figure 5:
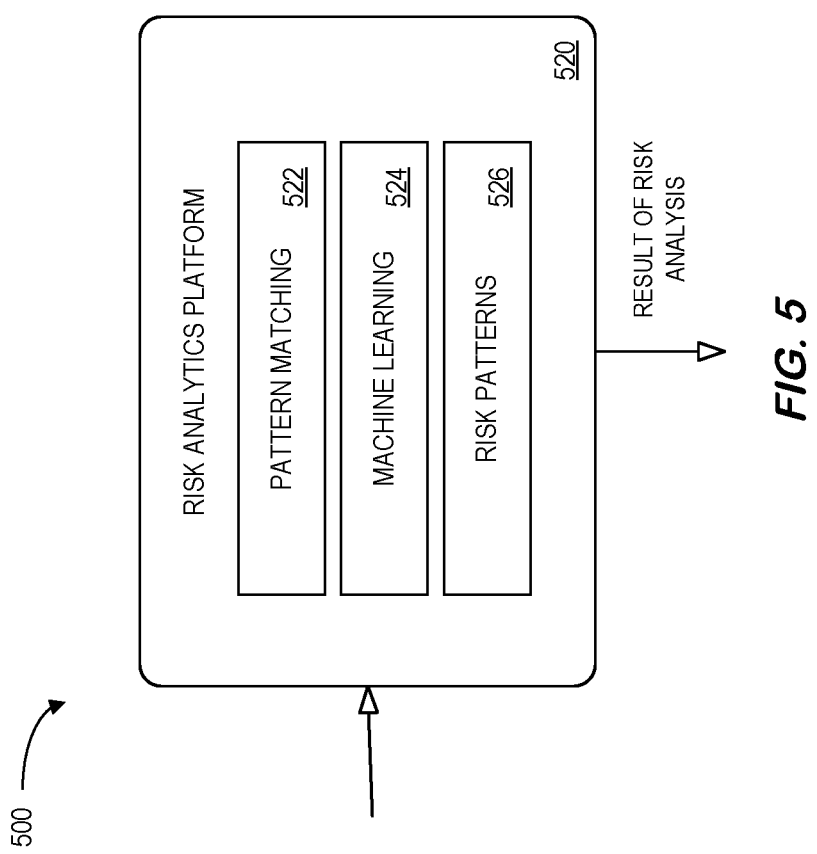
FIG. 5 illustrates a risk analytics platform in accordance with some embodiments.

FIG. 5 illustrates system 500 with a risk analytics platform 520 in accordance with some embodiments. The risk analytics platform 520 may utilize pattern matching 522, machine learning 524, and/or risk patterns 526 to generate a result of a risk analysis. Note that the facilitation and automation of loss control work may incorporate elements associated with artificial intelligence and robotics. For example, humans are not well suited to continuously monitor data scanning for an actionable event. In addition, sensors of different types might be needed to monitor and process certain categories events. Moreover, the data gathered may need to be monitored by a computer looking for recognizable actionable events. In some cases, sensors and robotics (e.g., mobile sensors controlled by an algorithm or by a remote human) can perform frequent, high-volume tasks that need efficiency and productivity. Artificial intelligence may then analyze the large amount of data to determine what real-world meaning is behind the signal, such as by recognizing that there may be a water leak on a roof (e.g., if the moisture is sharply different in one particular area). Thus, embodiments may facilitate early detection of an adverse event or condition to improve loss prevention. Robotic sensors combined with artificial intelligence may sense and respond to these risks better than human or non-existent processes. The use of sensor-heavy robotics to gather physical risk properties of environments (e.g., in a commercial setting) may let the system 500 may let loss control analytics function to alert staff for real-time action.

Figure 6:
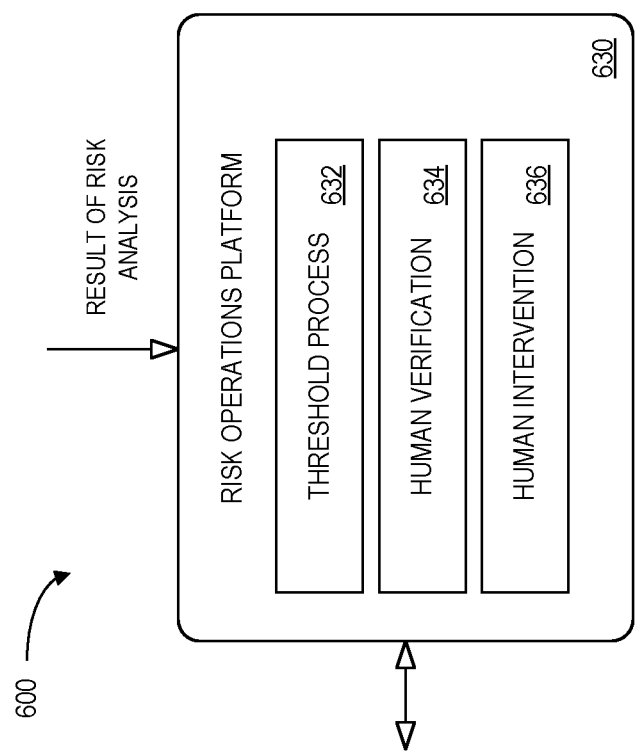
FIG. 6 illustrates a risk operations platform according to some embodiments.

FIG. 6 illustrates a system 600 with a risk operations platform 630 according to some embodiments. The risk operations platform 630 might be associated with an insurance company and respond to machine learning from sensor-driven input (e.g., a result of a risk analysis) that triggers actions by the risk operations platform 630 based on threshold values. The risk operations platform 630 may, for example, use a threshold process 632, human verification 634, and/or human intervention 636 to initiate investigative/corrective actions either by electronic means (robots) or by humans. Thus, the use of artificial intelligence and/or robotics may be fully autonomous and/or be integrated with human teamwork. Note that the term "robot" may refer to a mobile platform that contains various sensors to form a confident prediction conclusion. The robot may be autonomous to some degree, such as following pre-programmed routes along a building's floor. According to some embodiments, a robot may utilize algorithms that were downloaded from an insurance company's analytics center. According to some embodiments, the risk operations platform 630 may let a remote human operator take control over a robot at any time to direct its motion and actions (e.g., by using the robot's sensors to collect local data and then interacting with an interface to control the robot's on-board systems). The human operator might, for example, then drive the robot to a desired location, utilize the onboard sensors to see the area, hear the local sounds, and view data from the sensors. Note that a robot may carry various devices to aid with loss control and prevention, such as a fire suppression device and visual or audible alarms. The remote human operator may engage these systems to be activated as desired. Also note that, according to some embodiments, a sensor or robot could be a completely software-based process (that is, there does not need to be any physical component). For example, a software module or robot might "patrol" various IT networks, databases, servers, etc. looking for cyber-security issues. Similarly, a software agent might continuously check network activity, data packet contents, user logins, etc. and report a stream of data to a risk monitoring data store. Additionally, or alternatively, a software module or robot (capable of running and/or being controlled locally or remotely) may interface and control local computers and/or computer-controlled sensors such that the software module or robot may utilize and/or deploy such computers and sensors dynamically.

Figure 7:
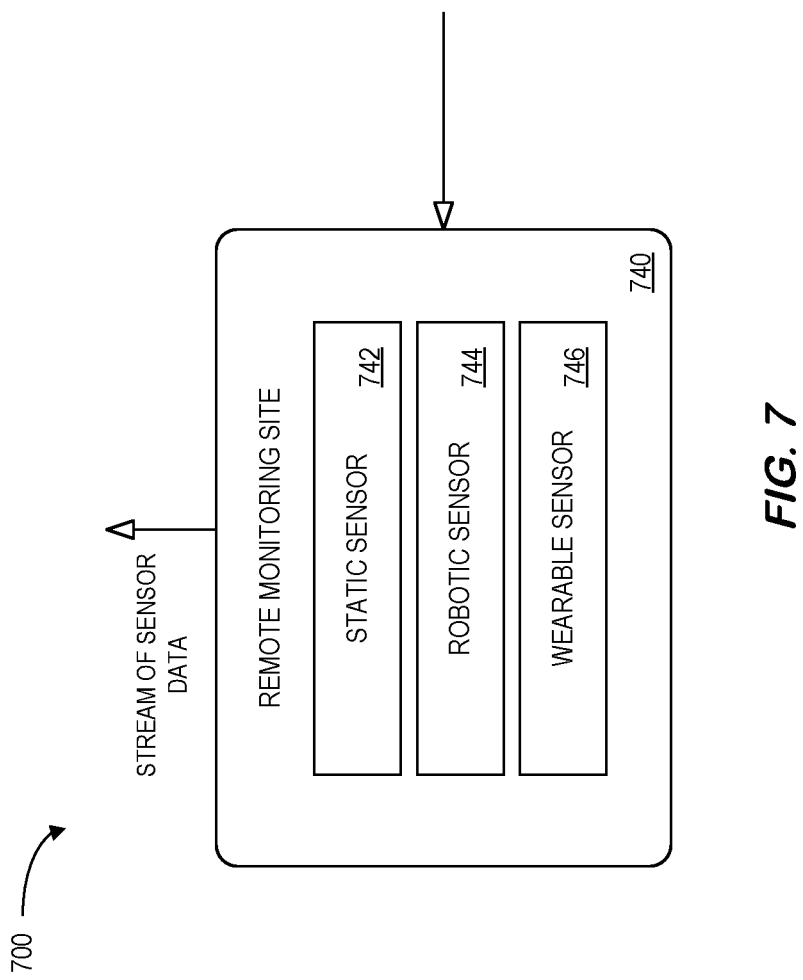
FIG. 7 illustrates sensor system in accordance with some embodiments.

FIG. 7 illustrates a system 700 with remote monitoring site 740 sensor systems in accordance with some embodiments. The remote monitoring site sensor systems may receive instructions from a risk operations platform and/or provide streams of information to a risk monitoring data store. The sensor systems at the remote monitoring site 740 may include static sensors 742 (e.g., microphones, smoke detectors, etc.), robotic sensors 744, and/or wearable sensors 746 (e.g., including smartphones). As a result, the system may gather information to provide insight about arising problems utilizing machine learning and multiple sensors (at times in combination). Note that the utilization of multiple sensors can deliver a richer set of data that can be correlated and processed using machine learning. As an example, consider a customer's machine (such as a hydraulic press) that has sensors for motor temperature, motor vibration, and hydraulic press cycles. In this case, high temperatures alone may not signal an issue, but high temperatures coupled with high motor vibration and perhaps low frequency press cycles may be noteworthy. As a result, machine learning may trigger investigation or an alarm. Moreover, machine learning may then integrate subsequent input data to identify whether or not the investigation or alarm was warranted. Once this deeper insight is achieved from an initial investigation, the system as a whole may adapt to the nuances of equipment behavior. According to some embodiments, potential risks associated with equipment (prior to an actual failure) may be determined via machine learning based on data collected from similar equipment used by other insured customers. By utilizing the breadth of equipment data employed by a wide array of customers, events may be linked to particular equipment manufacturers and models. In addition, machine learning may match previously noted equipment failures and predict when such a failure is going happen for a different customer using similar equipment. For example, the system 700 may become aware that an insured pump is approaching failure (based on sensor data from a chronometer, thermometer, and accelerometer) because the insurance company has experiences failures for that type of pump with similar sensor signatures (and a risk operations platform may be alerted).

Using various fields captured by the sensor systems at the remote monitoring site 740, data may be grouped in different ways (including by geography, business type, equipment used by the insured's business, etc.). Such an approach may help machine learning algorithms correlate and anticipate probable insured events. Furthermore, third-party data may be utilized to add more dimensions for this grouping, such as groups for business size, credit scores, earthquake history, flood history, etc.

According to some embodiments, robotic sensors 744 may communicate and utilize sensors within a building and/or sensors installed on equipment. Note that buildings may typically have security sensors, such as glass-break, door-open, acoustical and/or infrared sensors to detect intruders—and such security systems may also have water detection sensors to detect floods from storms or broken water hoses/pipes. The computers controlling the robotic sensors 744, whether on-board or remote, may interface and acquire data using these building security sensors. The robotic sensors 744 may acquire data from the building's security system (either proactively or reactively) to pursue investigation of triggered sensors and/to act as a security guard. Moreover, robotic sensors 744 at the customer site may utilize pattern recognition for various sensors (visual, audio, thermal, humidity, vibration, etc.) to perform baseline scans of the property. Pattern recognition might also be used to recognize employee faces and/or to tag faces that are not recognized to be investigated by security staff.

Robotic sensors 744 may use bi-directional communication to send data and to receive an updated control program from an insurance company. This means of communication might employ public and/or private clouds for information streaming. For example, an insurance company's analytics environment may update computational models based on recent input from the robotic sensors 744, resulting in updated action algorithms for the robotic sensor 744 to execute. According to some embodiments, a robotic sensor 744 that is deployed at a customer site may communicate observed data to other deployed robotic sensors 744 at the same site (such as baseline sensor readings and learned paths as part of a training process). In this way, time and effort to obtain all baseline information may be divided among multiple robotic sensors 744. According to some embodiments, sophisticated autonomous robotic sensors 744 may be trained in both normal and anomalous thermal patterns. The robotic sensors 744 may first be instructed to scan a location to gather normal thermal data from the walls, ceiling and floor this data will then constitute a baseline signature of the property. Later, when the robotic sensor 744 is performing daily duty, the current thermal scans may be compared in substantially real-time to the baseline to detect anomalous readings. If such anomalies are encountered, the controlling program will use the robotic sensor 744 as applicable to aid in fire suppression as well as to contact the fire department. In addition, the robotic sensor 744 may relay event information about the thermal event to an analytics environment at the insurance company.

Note that techniques such as machine learning may require large amounts of historical data to train models to make accurate predictions based on new data. The data that the robotic sensors 744 capture through can be fed back to an insurer's analytics environment to create beneficial predictive models associated with risk. By collecting data from many different sensors and aggregating data among multiple customers, an insurer may better predict impending risks, respond proactively, and/or model pricing and underwriting behaviors accordingly.

Although a robotic sensor 744 may act autonomously, control may be remotely taken over by a human. Such an ability may be useful when the robotic sensor 744 behaves unexpectedly or when there is a need to manually investigate a certain area in greater detail. Using either an on-board human interface screen or a remote-control system, the robotic sensor's movement and visual sensors may let a human gather additional data as needed (such as to inspect a hot spot or fire, investigate a suspected intrusion, etc.). Note that many locations may already be equipped with security systems, having sensors to detect events like unexpected motion and breaking glass, to alert the customer and/or authorities. According to some embodiments, a robotic sensor 744 may to interact with such security systems bi-directionally. For example, it may detect potential security concerns through its own sensors and send alerts to the security system. Additionally, the robotic sensor 744 may detect alarms raised by the security system and relay them back to an insurer's analytic environment.

Figure 8:
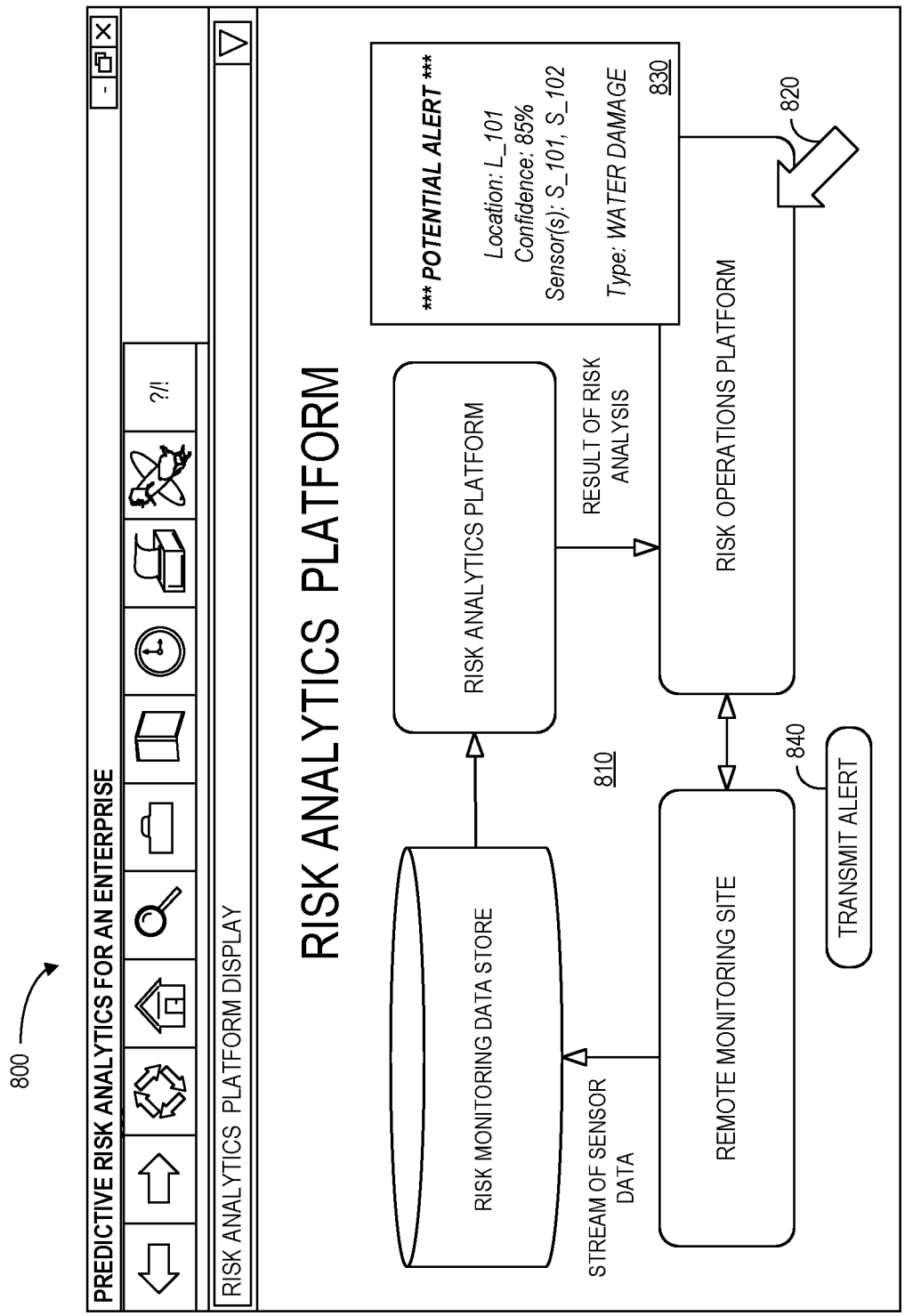
FIG. 8 is an example of a display according to some embodiments.

FIG. 8 is an example of a risk analytics platform display 800 according to some embodiments. The display 800 might include an interactive graphical representation 810 of elements of a closed-loop monitoring system. Selection of a graphical element (e.g., via a touchscreen or computer mouse pointer 820) may result in the display of additional information about that element (e.g., in a pop-up window) and/or give an operator the ability to adjust parameters for that element. The display 800 may further include information about a potential alert 830 (e.g., including a location, a confidence level, a list of sensors that triggered the event, an event type, etc.). Moreover, the display 800 may include a "Transmit Alert" icon 840 that, when selected by an operator, may cause an alert message to be transmitted to a risk operations platform.

Figure 9:
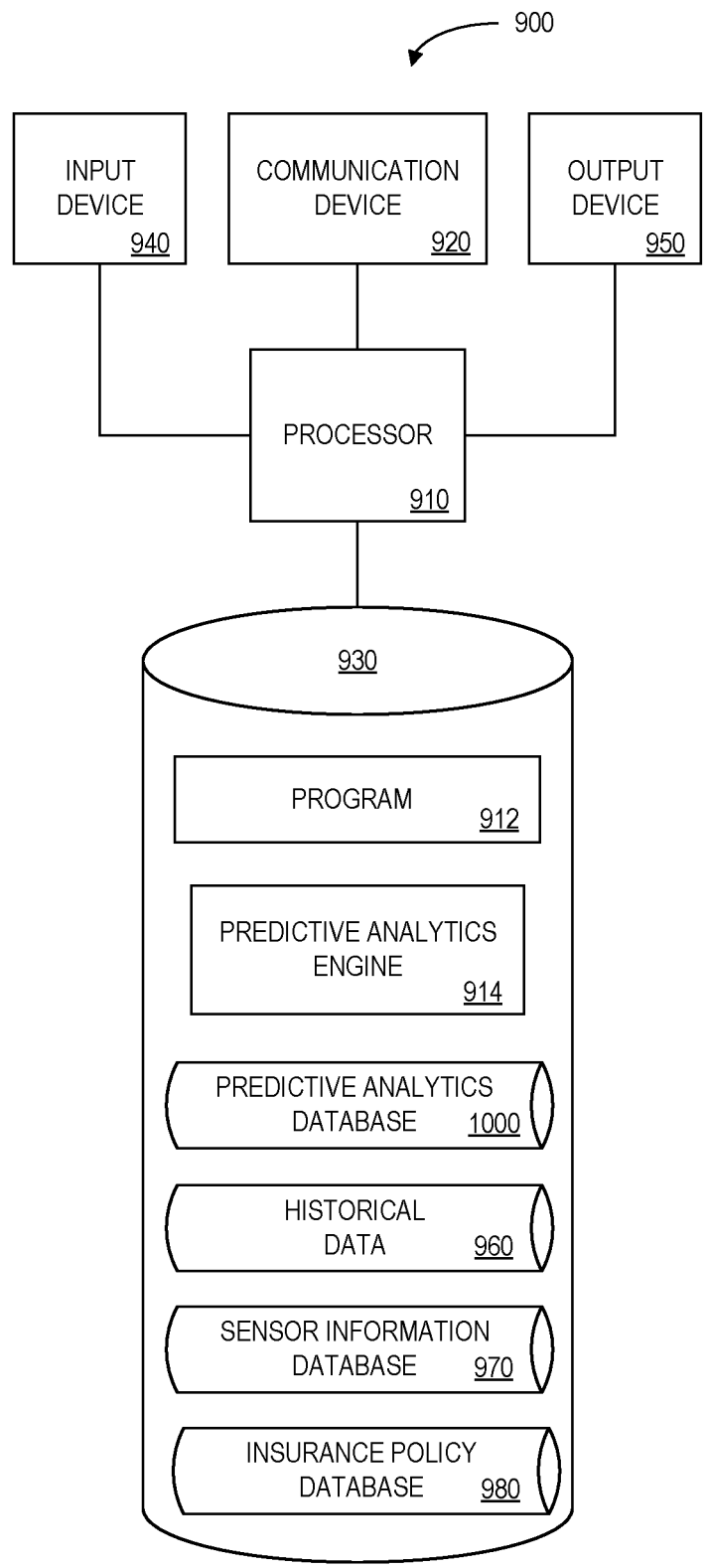
FIG. 9 is a block diagram of an apparatus in accordance with some embodiments of the present invention.

The embodiments described herein may be implemented using any number of different hardware configurations. For example, FIG. 9 illustrates a risk analytics platform 900 that may be, for example, associated with the system 100 of FIG. 1. The risk analytics platform 900 comprises a processor 910, such as one or more commercially available Central Processing Units (CPUs) in the form of one-chip microprocessors, coupled to a communication device 920 configured to communicate via a communication network (not shown in FIG. 9). The communication device 920 may be used to communicate, for example, with one or more remote sensors, operations platforms, etc. Note that communications exchanged via the communication device 920 may utilize security features, such as those between a public internet user and an internal network of the insurance enterprise. The security features might be associated with, for example, web servers, firewalls, and/or PCI infrastructure. The risk analytics platform 900 further includes an input device 940 (e.g., a mouse and/or keyboard to enter information about sensors and/or algorithms) and an output device 950 (e.g., to output reports regarding system administration, monitoring alerts, site modification recommendations, insurance policy premiums, etc.).

The processor 910 also communicates with a storage device 930. The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or predictive analytics engine or application 914 for controlling the processor 910. The processor 910 performs instructions of the programs 912, 914, and thereby operates in accordance with any of the embodiments described herein. For example, the processor 910 may receive a set of electronic data records, with each electronic data record being associated with a stream of sensor data received via a communication network from a remote set of sensor systems located at a risk monitoring site. The processor 910 may analyze the received sensor data, using at least one risk analytics algorithm, to detect an abnormal pattern associated with a predicted elevated level of risk at the risk monitoring site. The processor 910 may then automatically transmit a result of the analysis to a risk operations platform. The risk operations platform may then implement an active risk mitigation adjustment at the risk monitoring site responsive to the result of the analysis.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices.

As used herein, information may be "received" by or "transmitted" to, for example: (i) the risk analytics platform 900 from another device; or (ii) a software application or module within the risk analytics platform 910 from another software application, module, or any other source.

In some embodiments (such as shown in FIG. 9), the storage device 930 includes a predictive analytics database 1000, historical data 960, a sensor information database 970, and an insurance policy database 980. An example of a database that may be used in connection with the risk analytics platform 900 will now be described in detail with respect to FIG. 10. Note that the database described herein is only an example, and additional and/or different information may be stored therein. Moreover, various databases might be split or combined in accordance with any of the embodiments described herein. For example, the insurance policy database 980 and/or predictive analytics database 1000 might be combined and/or linked to each other within the predictive analytics engine 914.

Figure 10:
FIG. 10 is a portion of a tabular predictive analytic database in accordance with some embodiments.

Referring to FIG. 10, a table is shown that represents the predictive analytics database 1000 that may be stored at the risk analytics platform 900 according to some embodiments. The table may include, for example, entries identifying locations of sensors being monitored. The table may also define fields 1002, 1004, 1006, 1008, 1010 for each of the entries. The fields 1002, 1004, 1006, 1008, 1010 may, according to some embodiments, specify: a site location identifier 1002, an enterprise name 1004, a date/time 1006, a predictive analytic algorithm 1008, and an alert indication 1010. The predictive analytics database 1000 may be periodically created and updated, for example, based on information electrically received from sensors and/or a sensor hub via a cloud-based application.

The site location identifier 1002 and enterprise name 1004 may be, for example, unique alphanumeric codes identifying a particular site location for an enterprise (e.g., associated with a latitude/longitude, X/Y coordinate, etc.) where sensors to be monitored are located. The date/time 1006 and predictive algorithm 1008 might indicate when and how a calculated level of risk for a location was determined (along with, according to some embodiments, a level of confidence that the predicted risk is correct). The alert indication 1010 might indicate whether or not an alert signal was transmitted responsive to calculated risk value. For example, as illustrated by the third entry in the table 1000, an alert 1010 might be generated when a calculated level of risk exceeds a pre-determined threshold for a given location.

Figure 11:
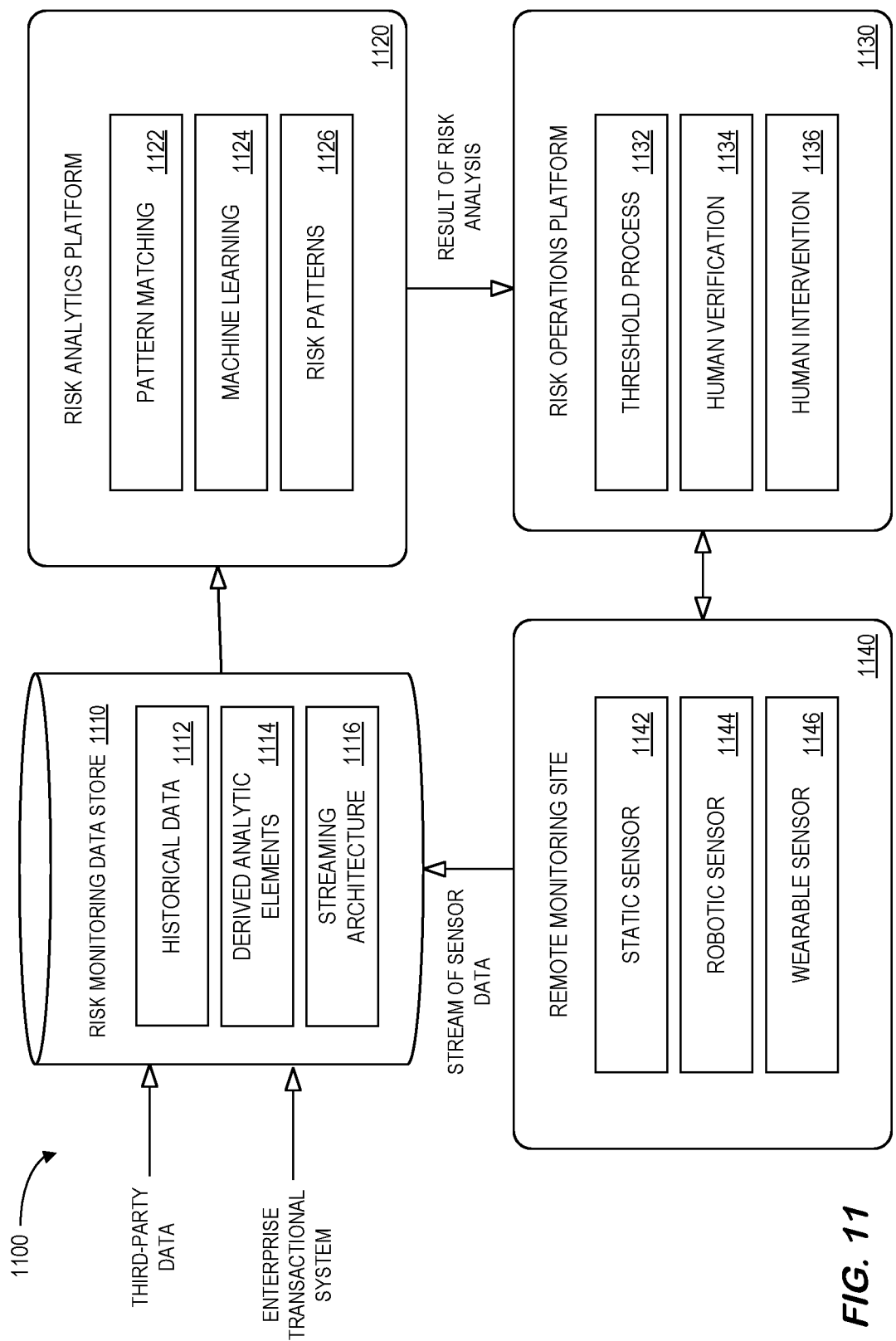
FIG. 11 is a more detailed block diagram of an enterprise system according to some embodiments.

FIG. 11 is a more detailed block diagram of an enterprise system according to some embodiments. As before, a risk monitoring data store 1110 receives a stream of sensor data from a remote monitoring site 1140. A risk analytics platform 1120 uses data from the risk monitoring data store 1110 to calculate a result of a risk analysis that is provided to a risk operations platform 1130. The risk monitoring data store 1110 may contain and utilize data such as historical data 1112 and derived analytic elements 1114, as well as support a streaming architecture 1116 to handle data in real-time (or near-real-time). The risk monitoring data store 1110 may also contain and utilize third-party data and/or corporate transactional systems. This data then flows to the risk analytics platform 1120 for analysis, algorithm, and instruction development via pattern matching 1122, machine learning 1124, and/or risk patterns 1126. Data and instructions are then sent to the risk operations platform 1130 where detection algorithms may trigger a thresholding process 1132 to initiate human verification 1134, which in turn can lead to human intervention 1136 (e.g., a human may use a robot or sensor to manually investigate). Instructions may be sent to static sensors 1142, robotic sensors 1144, and wearable sensors 1146 at the remote monitoring site 1140 so that the sensors can directed to acquire appropriate data. The sensors systems 1142, 1144, 1146 then send data to the risk monitoring data store 1110 to complete the cycle.

Figure 12:
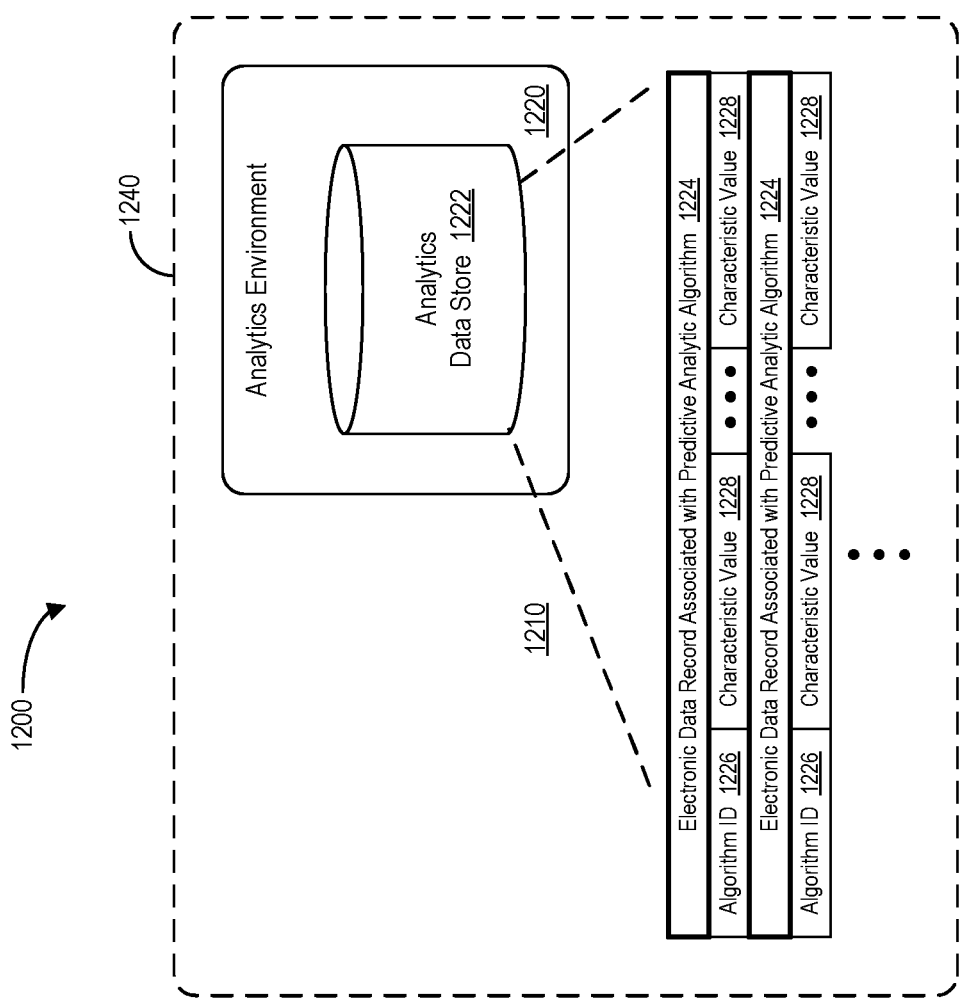
FIG. 12 is a system in accordance with some embodiments.

FIG. 12 is a high-level block diagram of a system 1200 that may be associated with predictive risk analytics according to some embodiments of the present invention. In particular, the system 1200 includes an analytics environment 1220 and an analytics data store 1222 might be co-located and/or may comprise a single apparatus (as illustrated by the dashed line 1240 in FIG. 12). Note that the analytics environment 1220 (and/or other components of the system 1200) may also exchange information with a remote user terminal (e.g., via a firewall). According to some embodiments, a back-end application computer server and/ or the remote user terminal may facilitate viewing, receiving, and/or interacting with data about predictive analytic algorithms. Moreover, a central repository (not illustrated in FIG. 12) might be used to store the results of such algorithms. According to some embodiments, the analytics environment 1220 (and/or other devices described herein) might be associated with a third party, such as a vendor that performs a service for an enterprise.

The analytics environment 1220 and/or other devices described herein might be, for example, associated with a PC, laptop computer, smartphone, an enterprise server, a server farm, and/or a database or similar storage devices. According to some embodiments, an automated analytics environment 1220 may facilitate an automated deployment of a predictive analytic algorithm based on electronic data records in the analytics computer store 1210. The analytics environment 1220 may store information into and/or retrieve information from the analytics data store 1222. The analytics data store 1222 might, for example, store electronic records associated with various analytic algorithm components 1224, including, for example, algorithm identifiers 1226 and component characteristic values 1228 (e.g., associated with inputs, outputs, business rules or logic, etc.). The analytics data store 1222 may be locally stored or reside remote from the analytics environment 1220. As will be described further below, the analytics data store 1222 may be used by the analytics environment 1220 to help deploy and manage algorithms for an enterprise According to some embodiments, the analytics environment 1220 may provide elements of a test and/or production environment (e.g., by using data security associated with production, and table creation, code writing, and other "object rights" of development). An analytic environment 1220 may help serve those doing business analytics, such as those in a data science role. Business analytics might be associated with, for example, statistical analysis (why is something happening?), forecasting (what if current trends continue?), predictive modeling (what will happen next?), and/or optimization (what is the best way to proceed?). The analytic environment 1220 may give users performing analytics and data science the usability, algorithms, compute power, storage capacity, data movement, and community enablement needed to be successful. According to some embodiments, large-scale enterprise operations may incorporate self-tuning, automated predictive analytics founded on end-to-end data quality using a unified self-service architecture.

Note that data scientists may produce predictive analytics models that let an enterprise, such as an insurance operation, take on risk based on possible future losses and/or monitor sensor at a remote site to help avoid losses. Such predictions may traditionally be done on systems that are largely disconnected from the operational systems where customers are found, business is written, and/or profit is made. Moving predictive models from data science workflows to operations workflows traditionally takes many months; commonly over a year for sufficiently large business problems that impact a large portion of a book of business. Some embodiments described herein make the flow between the two workflows in real-time or substantially real-time.

Figure 13:
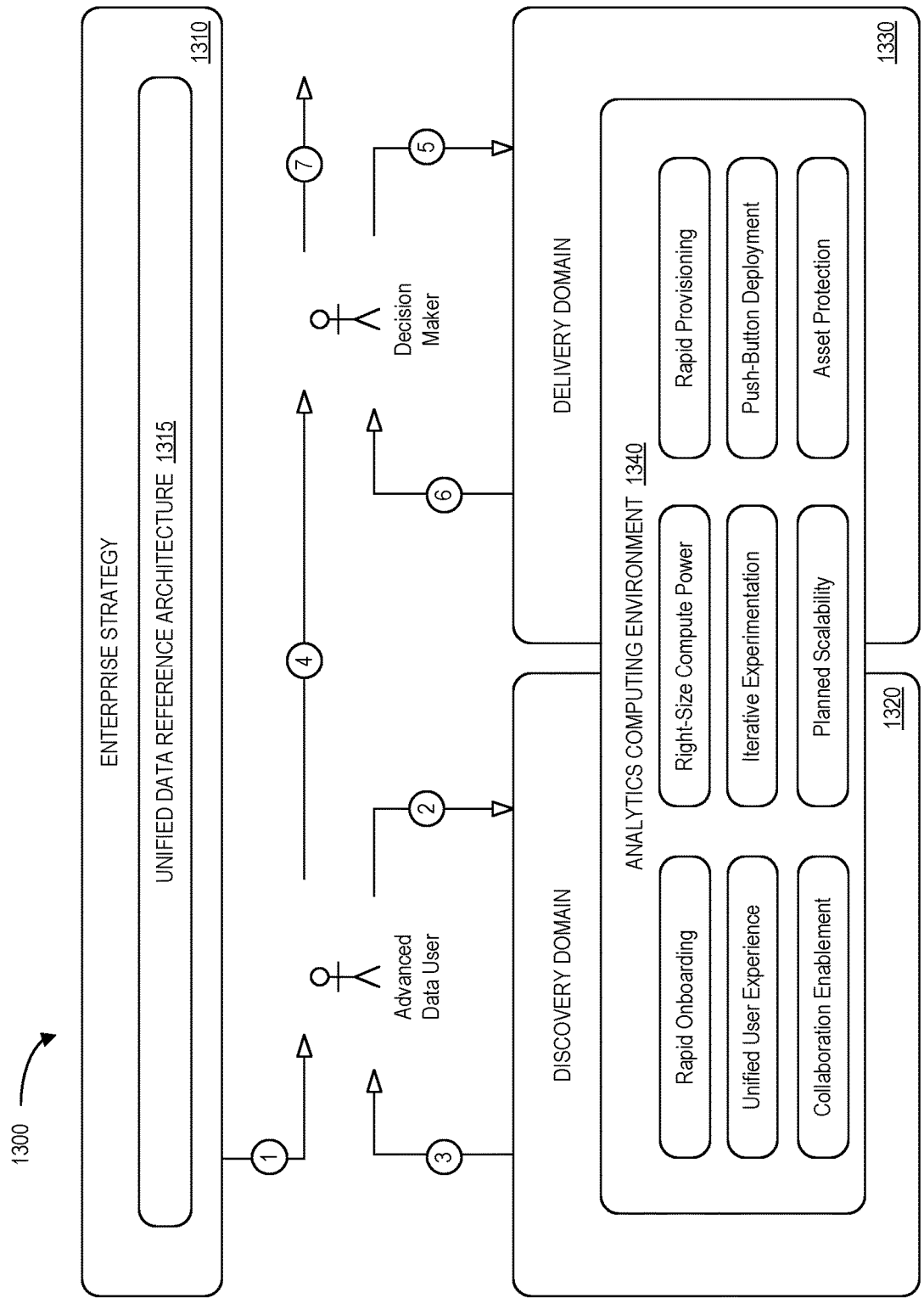
FIG. 13 illustrates an analytics computing environment in context in accordance with some embodiments.

FIG. 13 illustrates an analytics computing environment 1300 in context in accordance with some embodiments. The environment 1300 includes an enterprise strategy 1310 (e.g., including a unified data reference architecture 1315). Note that the environment 1300 may be the foundation of a discovery domain 1320 (e.g., publication, entitlements, visualization, policies, etc.), where business ideas may be shown to have value, and provide a direct path to a delivery domain 1330 (e.g., enterprise data warehouse, production workflows, etc.), where ideas become actions. In particular, an analytics computing environment 1340 (e.g., associated with value proposition, working areas, defined tooling, etc.) may help with that transition. According to some embodiments, the analytics computing environment 1340 may include rapid onboarding, a unified user experience, collaboration enablement, appropriate compute power, iterative experimentation, planned scalability, rapid provisioning, push-button deployment, and/or asset protection.

At (1), a mission may be provided from the enterprise strategy 1310 to an advanced data user. The advanced data user may then provide a hypothesis to the discovery domain 1320 at (2) and receive knowledge at (3). This process may be repeated until the advanced data user indicates a value to a decision maker at (4). The decision maker may then provide questions to the delivery domain at (5) and receive answers at (6). As a result of the answers, the decision maker can initiate an action at (7), such as by beginning to monitor sensor data from a remote customer site.

Figure 14:
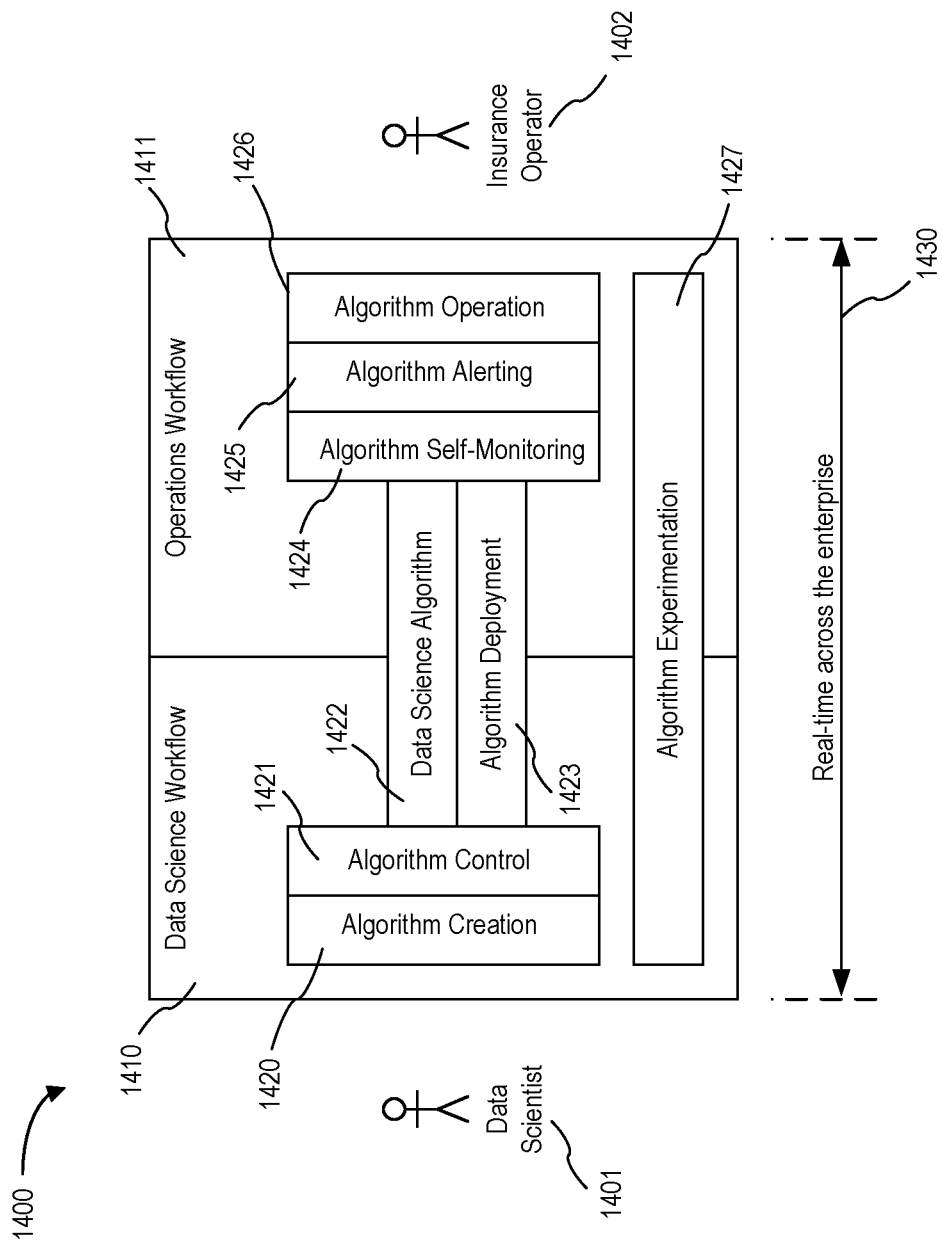
FIG. 14 is an analytics computing environment business process in accordance with some embodiments.

FIG. 14 is an analytics computing environment business process 1400 in accordance with some embodiments. In particular, FIG. 14 illustrates a connection between a data science workflow 1410 and an operations workflow 1411. Some embodiments described herein may provide substantially real-time enterprise data science operations for an enterprise, such as an insurance enterprise. Note that an insurance enterprise might want to inject data science algorithms directly into enterprise workflows in a real-time manner at an enterprise scale, yet still maintain sufficient auditing and controls inherent in the nature of insurance operations. Such auditing and controls might include, for example, filing rates with insurance offices, compliance with federal laws such as Sarbanes-Oxley, etc. Moreover, embodiments may provide an ability for users in a data science role to discover insights in data using algorithms typically considered predictive in nature (such those related as statistics, data mining, optimization, etc.). For example, embodiments may let data scientists create controls for the algorithms that allow for the operations of the algorithms within a broader enterprise systems environment. Such controls might be, for example, given to the data scientist (instead of a third party, such as a technology department, as is often needed in traditional designs). Embodiments may provide a channel for rapid deployment of algorithms into a location in the enterprise system that allows for use by production operations. Such deployment might include, for example, automated automation and version tracking sufficient to meet audit requirements inherent in the insurance industry. The real-time or substantially real-time systems might include underwriting operations, call center operations, Web site operations, etc. Note that such algorithms might be integrated into larger operational systems or may stand-alone.

As used herein, the phrase "data scientist" 1401 might refer to, for example, any system user who does non-trivial mathematical operations on data (e.g., operations using algebra, calculus, linear algebra, statistical analysis, optimization methods, and similar mathematical approaches). The data science 1401 role as used herein may include one person or many such people. As used herein, the phrase "insurance operator" 1402 might refer to, for example, any person whose job is to work within the operations workflow 1411, typically on software systems that contain a data science algorithm 1422. According to some embodiments, the data science algorithm 1422 may be embedded into the enterprise systems in a way that makes algorithm operations 1426 transparent to such users. The insurance operator 1402 role as used herein may include one person or many such people.

The data science workflow 1410 might be associated with a process by which a data scientist 1401 does the work of applying mathematics to data to find data science algorithms 1422 of sufficient interest to the enterprise to warrant putting them into the operations workflow 1411. The data science workflow 1410 may include activities related to readying the data science algorithm 1422 for use in the operations workflow 1411. Such readiness might include many activities that may vary by the nature of the algorithm or the operations workflow 1411 into which the algorithm is deployed. Examples of such activities might include creating a consistent interface, defining algorithm control 1421 parameters, and automating activities that would traditionally have been done manually by the data scientist 1401 were it not for the real-time or near real time actions end-to-end required by the enterprise. Creating a consistent interface may include creating such software elements as are required for the operations workflow 1411 software systems to call the data science algorithm 1422 in a manner stable enough for predictable algorithm operation 1426.

The operations workflow 1411 may refer to aspects of the business process supported by one or more software systems that allow the insurance operator 1402 to perform normal responsibilities. The operations workflow 1411 may, according to some embodiments, have functionality needed to call the data science algorithm 1422 that have been defined to have proper algorithm control 1421. Examples of allowing for such integration is the operations workflow 1411 systems having standardized calling mechanisms such as those based in REST or WS-* protocols. Given that operations workflows 1411 are typically embodied in systems built by enterprise IT departments, this type of functionality is commonly incorporated.

Algorithm creation 1420 may refer to aspects of the process whereby the data scientist 1401 uses mathematical activities on data to find insights for the business which can then be embodied in data science algorithm 1422. According to some embodiments, the algorithm creation 1420 may establish a location in the environment that is uniform across multiple adapted system components 1503 for both the community of those in the data scientist 1401 role and for systems across both the data science workflow 1410 and operations workflow 1411 (as described with respect to FIG. 15).

Algorithm control 1421 may refer to aspects of the process whereby the algorithm is embedded in software that has the properties and behaviors needed to function in a stable and repeatable manner in the operations workflow 1411. While this is often a contribution of a traditional IT department, engaging such a department may be too slow for an enterprise real-time or substantially real time use of the data science algorithm 1422 in operations workflows 1411. Instead, such readiness of the data science algorithm 1422 and its embodying software may become the responsibility of the data scientist 1401. Note that such tasks are traditionally thought of generally as software engineering. Some embodiments described herein may create systems and methods to make the data scientist 1401 successful enough at such tasks to meet the demands of the systems that embody the operations workflow 1411 (without taking too much away from the algorithm creation 1420 work that is the core to the business value proposition of the data scientist 1401). Moreover, embodiments may utilize a series of practices that enable efficient achievement of algorithm control. The artifact of such practices may be produced by one or more technology engineers 1501 (described with respect to FIG. 15) who know which practices are needed to meet the goals of algorithm control 1421, algorithm deployment 1423, algorithm self-monitoring 1424, algorithm alerting 1425, and algorithm operation 1426, but are required to publish such practices in a form usable at the more limited software engineering skill level of the data scientist 1401. Such practices might include, for example:

Use of environmental variables. Relatively low-skill code writers (which data scientists 1401 tend to be because it is not their primary skill set) may put physical locations in code. That can result in errors when the code is moved to a different location. The data scientists 1401 may be taught to decouple from the physical environment with environmental variables.

Time-independent logic. Relatively low-skill code writers may use the system clock, or otherwise assume "today" when doing date logic. This fails when something causes a time disruption, such as a batch job running a day late. The data scientists 1401 may be taught to store and reuse the last processed date.

Error handling. Relatively low-skill code writers tend to use system failure as an error handling mechanism—if it fails, then address it. This is rarely acceptable in the operations workflow 1411. Instead, the data scientists 1401 may be taught to do error handling such as try-catch logic common in many programming languages.

Such practices may be published, evolved, and worked on collaboratively between the data scientist 1401 and the technology engineer 1501 as a recurring process. Each of these software engineering practices (and similar ones) might be obvious to software professionals who are technology engineers 1501 by trade. However, taken as a series of standardized practices for those in a data scientist 1401 role, these practices may constitute a method to allow data scientists to embody their data science algorithm 1422 in software that works correctly and reliably in operations workflows 1411. Moreover, algorithm deployment 1423 and algorithm operation 1426 may now meet the real-time or substantially real-time actions end-to-end 1430 to achieve an enterprise business value proposition.

A data science algorithm 1422 may refer to aspects of the data science product that takes as input one or more data attributes for one or more data records and produces as output some indication of the relationship of those records to a predicted attribute of interest to the business. This may include, for example, the strict definition of an algorithm: "a process or set of rules to be followed in calculations or other problem-solving operations, especially by a computer." The phrase may also include any coding, software, networking, application programming interfaces, predictive models, predictive model metadata, predictive model hyper-parameters, or other system components or functionality to gather, move, deliver, or deploy such functionality in an enterprise environment across either data science workflow 1410 or operations workflow 1411.

Algorithm deployment 1423 may refer to aspects of getting the components that embody the data science algorithm 1422 into the operations workflow 1411. Some embodiments may collect the components into a single deployable unit that can be moved to the systems of the operations workflow 1411. The components in their deployable unit may be given a version number so that they can be tracked, but also promoted and demoted in the algorithm experimentation 1427 process. Several algorithm deployment 1423 methods may be available, but at least one may automatically version control the release on a different server over which the data scientist 1401 does not have control. Such remote, locked-down source control might help, for example, meet insurance audit requirements for systems.

Algorithm self-monitoring 1424 may refer to aspects of the deployed embodiment of the algorithm's ability to understand its own state, or report it state to either a data scientist 1401 or an insurance operator 1402 for user intervention as needed. Such monitoring may include, for example, simple notions such as proper operation, but may also include any aspect of algorithm operation that is integral to the business such as dangerous outlying conditions occurring, or values moving outside of expected norms. Regardless of the particular monitoring that occurs, an algorithm has been coded by the data scientist 1401 may know its critical conditions, and embodiments may let the algorithm conduct such self-monitoring. An example might include an algorithm binning its output into deciles over time and knowing that a condition of interest has occurred when any bin is some percentage outside its normal trend. Such monitoring algorithms tend to be reusable across algorithms, therefore the frequently used monitoring algorithms might be generalized and stored in a reusable components 1524 library (described with respect to FIG. 15).

Algorithm alerting 1425 may refer to aspects of notifying the data scientist 1401, insurance operator 1402, or technology engineer 1501 when some algorithm self-monitoring 1424 event becomes a condition of interest. Operations workflows 1411 might have, according to some embodiments, highly engineered alerting mechanisms in place as these are critical to traditional technology operations. The algorithm alerting design connects the deployed data science algorithm 1422 into the operations workflow 1411 by using the interface design of the algorithm control 1421. With that connection, the algorithm self-monitoring 1424 may trigger the alerting mechanisms in the operations workflow 1411. Such triggered alerts can then be sent to the data science workflow 1410. Note that a data science workflow 1410 typically does not have the level of rigor associated with the operations workflow 1411. Such rigor is not necessary because the data science workflow 1410 can use something as simple as email to receive the alerts. According to other embodiments, the data science workflow 1410 has specialized alerting dashboards for the data scientist 1401.

Algorithm operation 1426 may refer to aspects of executing the data science algorithm 1422 in its software embodiment in the operations workflow 1411. This might include, for example, the processing of any record of data with the input attributes and producing the scoring values that are the very purpose of the model. Such operation may also include performing algorithm self-monitoring 1424 and algorithm alerting 1425 as the operation of the algorithm occurs.

Algorithm experimentation 1427 may refer to aspects of data science algorithm 1422 experiments that are enabled across an enterprise as a result of previously described functionality. That is, is may become possible to move from algorithm creation 1420 to algorithm operation 1426 at real-time speeds with the security required in insurance operations (and with the stability needed for enterprise systems). As the data scientist 1401 is given charges to find predictive insights, and then finds them, the data scientist may then get them to the job of the insurance operator 1402 as fast as possible. The system may track the version control number across all platforms. The algorithm self-monitoring 1424 and algorithm alerting 1425 may track the metrics of the experiment. The algorithm deployment process 1423 may allow for the rapid redeployment of new algorithms as algorithm operations 1426 provide new information. These may then be combined with several new elements of experimentation design. The system may allow for multiple versions of an algorithm to be in place in the operations workflow 1411 at any one time, and for the systems of the operations workflow 1411 to choose among them for comparison. This is similar to "A/B testing" of a more traditional system (such as web page variations). The system may also allow for algorithm section between the several deployed models. This model selection can be done via manual involvement by the data scientist 1401 or the insurance operator 1402, but it can also be selected by the model itself, for example when the model detects for itself based on algorithm self-monitoring 1424 that some version of itself is performing better than others. When a model self-selects, it may then let the data scientist 1401 or insurance operator 1402 know via algorithm alerting 1425.

Real-time actions across the enterprise 1430 may refer to aspects getting previously described elements to perform their function at the required speed and system scale. The constraint of real-time and requiring that all functions span across the many systems that occur in an enterprise, may refer to the literal definition of "real-time" in the sense that the algorithm self-monitoring 1424 can produce algorithm alerting 1425 that is fed directly into algorithm operation 1426 such that the data science algorithm 1422 immediately alters its behavior in a system context with no intervention by any user. Real-time herein shall be taken to include any short period of time needed for the system to alter a user in a role, for that user to apply judgment, then for that user to allow the system to execute an action. Fifteen minutes is one example of a substantially real-time response. That which is not real-time or substantially real-time is typically referred to as "batch." Note that any of the embodiments described herein might utilize batch or micro-batch operations (the use of batch operations so small they appear real-time or near-real time). As used herein, the term "enterprise" may refer to the systems of an organization that embody execution of business operations in software. This might include, for example, one or more software systems, where the engineering to handle handling of dozens of such systems in real-time may be a requirement of the business.

Figure 15:
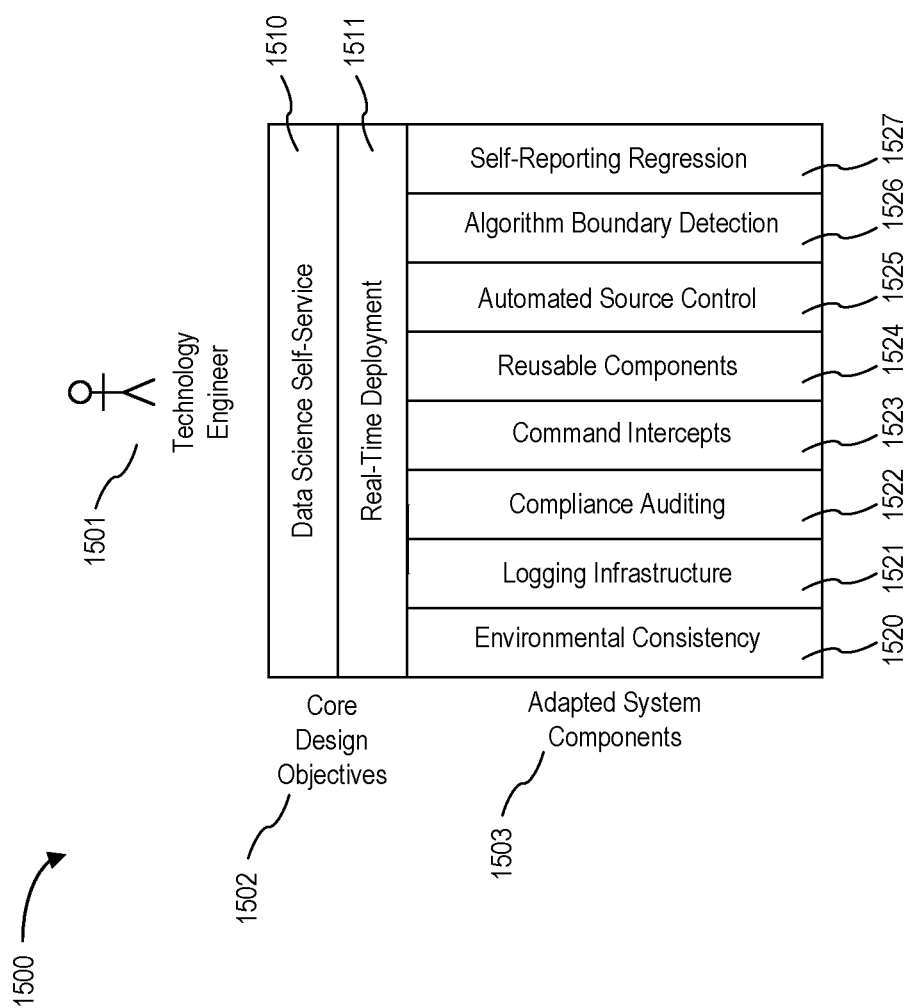
FIG. 15 is an analytics computing environment technical architecture according to some embodiments.

FIG. 15 is an analytics computing environment technical architecture 1500 according to some embodiments. In particular, FIG. 15 illustrates components that might embody a system that is visible to the data scientist 1401 and insurance operator 1402 roles. Such components may be engineered in a manner that gives the data scientist 1401 more direct control in achieving the elements of the business process 1400, ultimately landing in the operations workflow 1411 that enables real-time actions across the enterprise 1430.

As used herein, the phrase "technology engineer" 1501 might refer to, for example, the role of creating the components that create the system behavior needed to allow the business functions detailed in the business process 1400. The skills of the role may create the environment and provide the support of enabling the data scientist 1401 to deliver algorithms. A non-limiting example includes submitting work to a server cluster with very user-friendly commands. Such clusters may be very complex to manage, and often have specific constraints about which network cards to communicate over, how much memory to allocate, which work queue to run in, etc. In this example, the technology engineer 1501 staff may produce a Linux shell script that figured these and similar things out on behalf of the user without his or her knowledge of cluster complexity. The technology engineer 1501 role as used herein may include one person or many such people.

Core design objectives 1502 may provide clarity into the motivation for creating the several adapted system components 1503 and is used only for reference here. Adapted system components 1503 may refer to aspects to facilitate both the core design objectives 1502 and, in turn, the business functionality of the business process 1400. The adapted system components 1503 may be system components in the most traditional sense—software embodiments that are an integral part of an enterprise system. The adaptations may require the technology engineer 1501 to consider the core design objectives and the functionality of the business process 1400, and engineer a solution associated with the various elements described with respect to FIG. 15.

Data science self-service 1510 may refer to aspects of requiring that the technology engineer 1501 build system components that allow the data scientist 1401 to perform the work of the business process 1400 using their own skills and through direct access and control of the system rather than the more traditional approach of giving requirements to the technology engineer 1501 and letting the team of technology engineering staff produce the systems and methods to embody the data science algorithm 1422 and the surrounding business process 1400. The data scientist 1401 is assumed to a reasonably good ability to write basic computer code, but is not assumed to have the skills of a software engineer. Basic computer code may include such things as file operations, control statements such as "for" loops, and basic error handling (but not such things as advanced error handling, object-oriented design, notions of generalization and reusability, etc.). The data science self-service 1510 core design objective 1502 may be implemented, for example, using back-end application computer servers and other devices that will improve the productivity of the data scientist 1401 team.

Real-time (or substantially real-time) deployment 1511 may refer to aspects of moving the embodiment of the data science algorithm 1422 in computer code from the data science workflow 1410 to the operations workflow 1411 such that all components integrate smoothly with the other elements within the operations workflow 1411. One example of such deployment is simply giving the data scientist 1401 team File Transfer Protocol ("FTP") access from the servers where data science workflow 1410 takes place to the servers where operations workflow 1411 takes place. A more advanced example of such deployment is the creation by the technology engineer 1501 of scripts that automatically source control all code safely in an enterprise repository, and use advanced system rights not within the control of the data scientist 1401 to move the components to the systems in the operations workflow and perform all such compilation, configuration, or other setup work as needed to make the data science algorithm 1422 work in the production workflow 1411. The real-time deployment 1511 core design objective 1502 may be implemented, for example, using back-end application computer servers and other devices to let an enterprise rapidly take advantage of the work of the data scientist 1401 team.

Environmental consistency 1520 may refer to aspects of ensuring that both insurance operators 1402 and system components of the technical architecture 1500 can be guaranteed that no matter where in the business process 1400 or technical architecture 1500 is placed, the environment is orthogonal. This includes such things as taking over the centralized environmental login scripts of the operating system and programming languages, ensuring that files always have the same paths available, aliasing database names in ways that don't change even if the host computer does, and similar constructs commonly known as "indirection" in computer science theory. Such constructs may be oriented around the productivity experience of the data scientist 1401 working in a context that requires performing the given business process 1400 in real-time across the enterprise 1430. For example, where traditional software may assume either a technology engineer 1501 who has technical skills (and can see the inner workings) or an insurance operator 1402 who has business skills (and cannot see the inner workings), the environment assumes that the data scientist 1401 is a hybrid that has business skills and can see the inner workings. To address this, the technology engineer 1501 may build components into the reusable components 1524 library that result in system commands and controls that automate and simplify large portions of the data science workflow by creating environmental consistency 1520, but do not create a fully completed system (and instead require the data scientists 1401 to use those consistent components as part of their algorithm creation 1420 and algorithm control 1421 work).

Logging infrastructure 1521 may refer to aspects of the allowing any component of the business process 1400 or technical architecture 1500 to communicate with any other component to achieve any goal of the system that can only be achieved through the interaction of two more components. The most native layer of such a framework will use technologies commonly known as message queuing or an enterprise service bus. Layered on top of that is a communication framework that is uniquely designed around communication of data science algorithm 1422 behavior as it flows real-time across the enterprise 1430. According to some embodiments, the communication design includes parameters similar to that found in the Predictive Modeling Markup Language ("PMML") that are extended with proprietary elements related to insurance work, carrying the information inherently needed by various insurance operator roles, including advanced concerns around such things as underwriting and actuarial needs. Use of the logging system by a single component for its own behavior is naturally may also be included in the design. Note that the logging infrastructure 1521 may include hardware components to monitor activity, storage devices to store electronic data records to record the activity, etc.

Self-reporting regression 1527 may refer to aspects of having the data science algorithm and the supporting behaviors of the business process 1400 test themselves and report any concerns to appropriate roles. Given the high level of automation of other elements, it may be possible to run the system against a body of test data and determine if there are areas of concern. In particular, the algorithm self-monitoring 1424 and algorithm alerting 1425, while mainly designed for their value in the operations workflow 1411, might work without modification for self-reporting regression 1527. To achieve this, a sufficiently representative example (or possibly all) of the data that might be used or encountered in the operations workflow 1411 could be emulated into a testing environment. The entire solution might then be configured identically, but without interrupting actual operations workflow 1411. The system may be run against test data and all normally generated algorithm alerting may be monitored.

Data security and/or commend intercepts 1523 may refer to aspects of data security design forced to change to handle the nature of self-service in real-time (or in substantially real-time). To achieve self-service in real-time, it may be necessary to give the data scientist 1401 an above-average level of system control. However, to meet the legal, compliance, privacy, and information protection a more fine grain and rapid audition process might be in place. Such a data security design might inherently require use of the logging infrastructure 1521. That logging infrastructure 1521 may be, for example, connected to an alerting process that goes directly to an operations team who maintains a set of rules for what is (and is not) allowed by the data scientists 1401. The operations team can then contact the data scientist 1401 to investigate or get the action reversed, or the operations team can directly alter the system to bring it back to a secure state.

Command intercepts 1523 may refer to aspects of getting the logging, audition, and security actions down to the finest needed grain. Potentially risky commands may be logged in real-time to a centralized server that is not under the control of the data scientist 1401 or the insurance operator 1402. This ensures that every potentially risky action is known, and such knowledge cannot be altered by the user. Examples of such command intercepts 1523 include controlling the PROMPT_COMMAND, inserting operating system shims to intercept application communications, etc. Such command intercepts 1523 may be a low as individual keystrokes or a more course grain, such as connecting and disconnection from an application (if the courser grain is all that is required). The command intercepts 1523 might be implemented in hardware, software, or a combination of hardware and software devices.

Reusable components 1524 may refer to aspects of the system and method produced by either the data scientist 1401 or the technology engineer 1501 as part of the implementation of either the business process 1400 or technical architecture 1500 that can be modularized, stored in a library, uniquely identified and/or described, and then reused again in future solutions. The method may include the publication of standardized practices that ensure the reusability in future context. A process may be established to allow the data scientist 1401 and technology engineer 1501 to continually contribute the library in a manner that allows its continued manageability as it grows. The process might also allow such reuse to occur in the future with other personnel who are in the same roles. The reusable components 1524 could be stored as a searchable library of electronic files in a central repository.

Automated source control 1525 may refer to aspects of providing a mechanism to automatically source control all elements of the reusable components as part of the algorithm deployment 1423 so that the corporate intellectual property that is inherent in the data science algorithm 1422 is protected without the need for explicit action by any person an either role. For data science algorithms 1422 that are of sufficient value to the organization, the path from the data science workflow 1410 to operations workflow 1411 may be gated in such a way that the only path to the operations workflow 1411 is through the automated source control 1525 process, thus forcing protection of the corporate intellectual property in a means typically required of financial services and insurance companies.

Algorithm boundary detection 1526 may refer to aspects of the data science algorithm 1422 that notify staff that it has crossed some defined thresholds and may need intervention from an appropriate role. Such boundary conditions (e.g., maximum values, minimum values, a series of values over a period of time, etc.) might be built into the algorithm control 1421 aspects of the solution to both facilitate and leverage the algorithm. According to some embodiments, self-reporting regression 1527 may refer to aspects of the system that makes sure it works with test data (e.g., to see if any boundaries are triggered). According to some embodiments, a back-end application computer server executing a predictive analytic algorithm may facilitate the algorithm boundary detection 1526 (e.g., by having the algorithm itself monitor its own results and/or the results of other algorithms).

Figure 16:
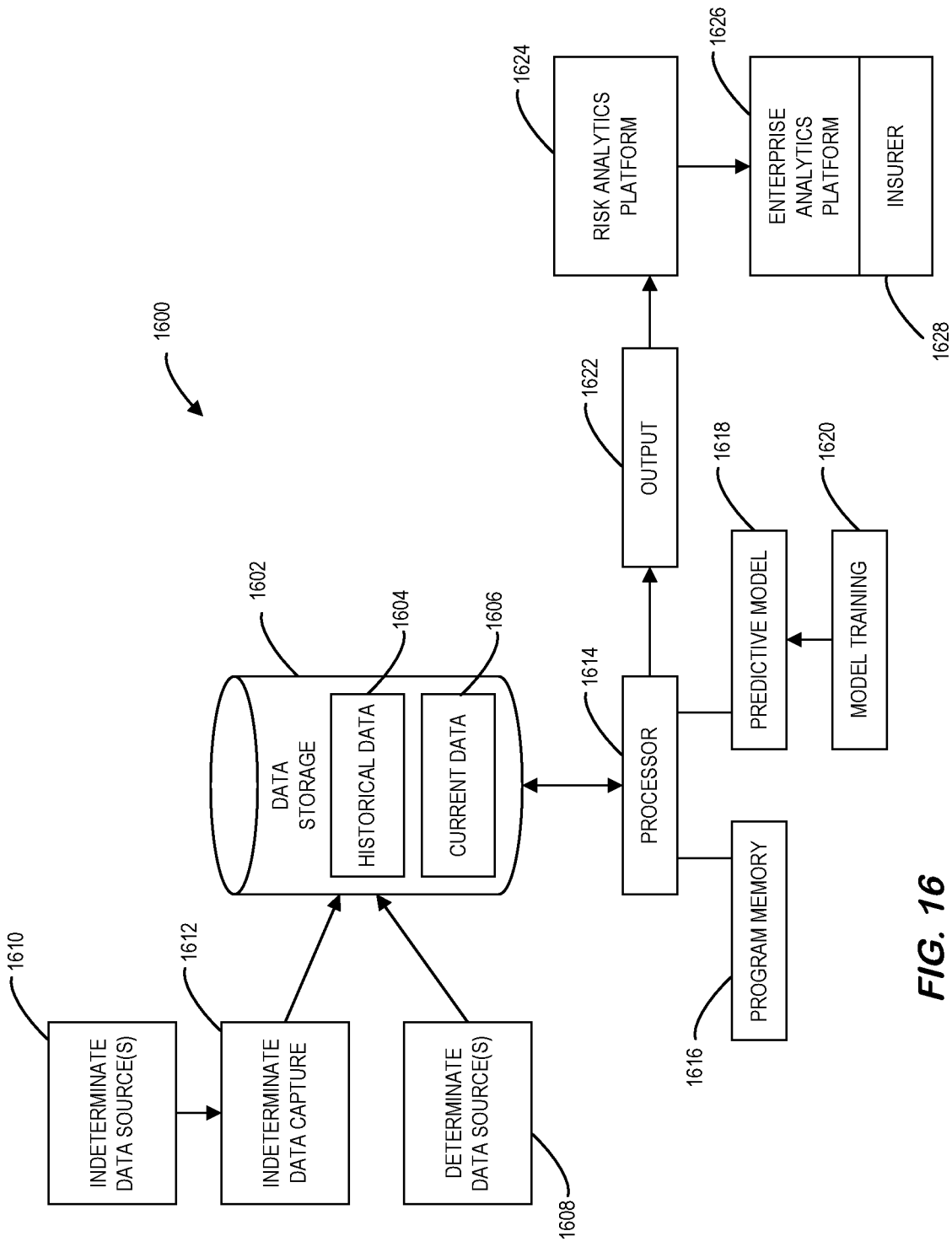
FIG. 16 illustrates a system associated with a predictive model according to some embodiments.

Thus, according to some embodiments one or more predictive models may be used to help avoid insurance losses based on prior events and claims. Features of some embodiments associated with a predictive model will now be described by first referring to FIG. 16. FIG. 16 is a partially functional block diagram that illustrates aspects of a computer system 1600 provided in accordance with some embodiments of the invention. For present purposes, it will be assumed that the computer system 1600 is operated by an insurance company (not separately shown) to support closed-loop sensor monitoring and processing.

The computer system 1600 includes a data storage module 1602. In terms of its hardware the data storage module 1602 may be conventional, and may be composed, for example, by one or more magnetic hard disk drives. A function performed by the data storage module 1602 in the computer system 1600 is to receive, store and provide access to both historical transaction data (reference numeral 1604) and current transaction data (reference numeral 1606), such as data containing streams of sensor information. As described in more detail below, the historical transaction data 1604 is employed to train a predictive model to provide an output that indicates potential sensor signatures patterns, and the current transaction data 1606 is thereafter analyzed by the predictive model. Moreover, as time goes by, and results become known from processing current transactions, at least some of the current transactions may be used to perform further training of the predictive model. Consequently, the predictive model may thereby adapt itself to changing event impacts and damage amounts.

Either the historical transaction data 1604 or the current transaction data 1606 might include, according to some embodiments, determinate and indeterminate data. As used herein and in the appended claims, "determinate data" refers to verifiable facts such as the age of a building; a building type; an event type (e.g., a burst pipe or flood); a date of loss, or date of report of claim, or policy date or other date; a time of day; a day of the week; a geographic location, address or ZIP code; and a policy number. As used herein, "indeterminate data" refers to data or other information that is not in a predetermined format and/or location in a data record or data form. Examples of indeterminate data include narrative speech or text, information in descriptive notes fields, image information, and signal characteristics in audible voice data files. Indeterminate data extracted from medical notes or accident reports might be associated with, for example, an amount of loss and/or details about damages. The determinate data may come from one or more determinate data sources 1608 that are included in the computer system 1600 and are coupled to the data storage module 1602. The determinate data may include "hard" data like a sensor signature, a claimant's name, tax identifier umber, policy number, address; the date of loss; the date the claim was reported, etc. One possible source of the determinate data may be the insurance company's policy database (not separately indicated). Another possible source of determinate data may be from data entry by the insurance company's claims intake administrative personnel. The indeterminate data may originate from one or more indeterminate data sources 1610, and may be extracted from raw files or the like by one or more indeterminate data capture modules 1612. Both the indeterminate data source(s) 1610 and the indeterminate data capture module(s) 1612 may be included in the computer system 1600 and coupled directly or indirectly to the data storage module 1602. Examples of the indeterminate data source(s) 1610 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 1612 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, claim handlers' opinions may be extracted from narrative text file notes.

The computer system 1600 also may include a computer processor 1614. The computer processor 1614 may include one or more conventional microprocessors and may operate to execute programmed instructions to provide functionality as described herein. Among other functions, the computer processor 1614 may store and retrieve historical claim transaction data 1604 and current claim transaction data 1606 in and from the data storage module 1602. Thus, the computer processor 1614 may be coupled to the data storage module 1602.

The computer system 1600 may further include a program memory 1616 that is coupled to the computer processor 1614. The program memory 1616 may include one or more fixed storage devices, such as one or more hard disk drives, and one or more volatile storage devices, such as RAM devices. The program memory 1616 may be at least partially integrated with the data storage module 1602. The program memory 1616 may store one or more application programs, an operating system, device drivers, etc., all of which may contain program instruction steps for execution by the computer processor 1614.

The computer system 1600 further includes a predictive model component 1618. In certain practical embodiments of the computer system 1600, the predictive model component 1618 may effectively be implemented via the computer processor 1614, one or more application programs stored in the program memory 1616, and data stored as a result of training operations based on the historical claim transaction data 1604 (and possibly also data received from a third-party reporting service). In some embodiments, data arising from model training may be stored in the data storage module 1602, or in a separate data store (not separately shown). A function of the predictive model component 1618 may be to determine appropriate simulation models, results, and/or scores (e.g., a rating indicating how likely a loss event is based on prior data from similar sites). The predictive model component may be directly or indirectly coupled to the data storage module 1602.

The predictive model component 1618 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 1600 includes a model training component 1620. The model training component 1620 may be coupled to the computer processor 1614 (directly or indirectly) and may have the function of training the predictive model component 1618 based on the historical claim transaction data 1604 and/or information about noise events, incidents, and alerts. (As will be understood from previous discussion, the model training component 1620 may further train the predictive model component 1618 as further relevant data becomes available.) The model training component 1620 may be embodied at least in part by the computer processor 1614 and one or more application programs stored in the program memory 1616. Thus, the training of the predictive model component 1618 by the model training component 1620 may occur in accordance with program instructions stored in the program memory 1616 and executed by the computer processor 1614.

In addition, the computer system 1600 may include an output device 1622. The output device 1622 may be coupled to the computer processor 1614. A function of the output device 1622 may be to provide an output that is indicative of (as determined by the trained predictive model component 1618) particular risk values based on sensor data, events, insurance underwriting parameters, and recommendations. The output 1622 may be generated by the computer processor 1614 in accordance with program instructions stored in the program memory 1616 and executed by the computer processor 1614. More specifically, the output 1622 may be generated by the computer processor 1614 in response to applying the data for the current simulation to the trained predictive model component 1618. The output 1622 may, for example, be a potential alert, a monetary estimate, a risk level, and/or likelihood within a predetermined range of numbers. In some embodiments, the output 1622 may be implemented by a suitable program or program module executed by the computer processor 1614 in response to operation of the predictive model component 1618.

Still further, the computer system 1600 may include a risk analytics platform 1624. The risk analytics platform 1624 may be implemented in some embodiments by a software module executed by the computer processor 1614. The risk analytics platform 1624 may have the function of rendering a portion of the display on the output device 1622. Thus, the risk analytics platform 1624 may be coupled, at least functionally, to the output 1622. In some embodiments, for example, the risk analytics platform 1624 may direct workflow by referring, to an enterprise analytics platform 1626, alerts generated by the predictive model component 1618 and found to be associated with various results or scores. In some embodiments, this data may be provided to an insurer device 1628 for further investigation.

Thus, the computer system 1600 may be used to create one or more analytic models to help monitor and/or mitigate the risk of potential loss. As a result, some embodiments may provide a closed-loop monitoring system that can help mitigate damages, such as by avoiding unscheduled equipment downtime, and thereby save money. For example, by obtaining elapsed run hours using equipment chronometers, condition sensors (such as vibration sensors and thermal sensors), and evaluating known events for such equipment reported by other customers, the closed-loop artificial intelligence system can help predict upcoming equipment failures. Operations can be alerted in advanced so that back-up systems or replacement systems can be arranged—thereby avoiding unscheduled equipment downtime.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 17:
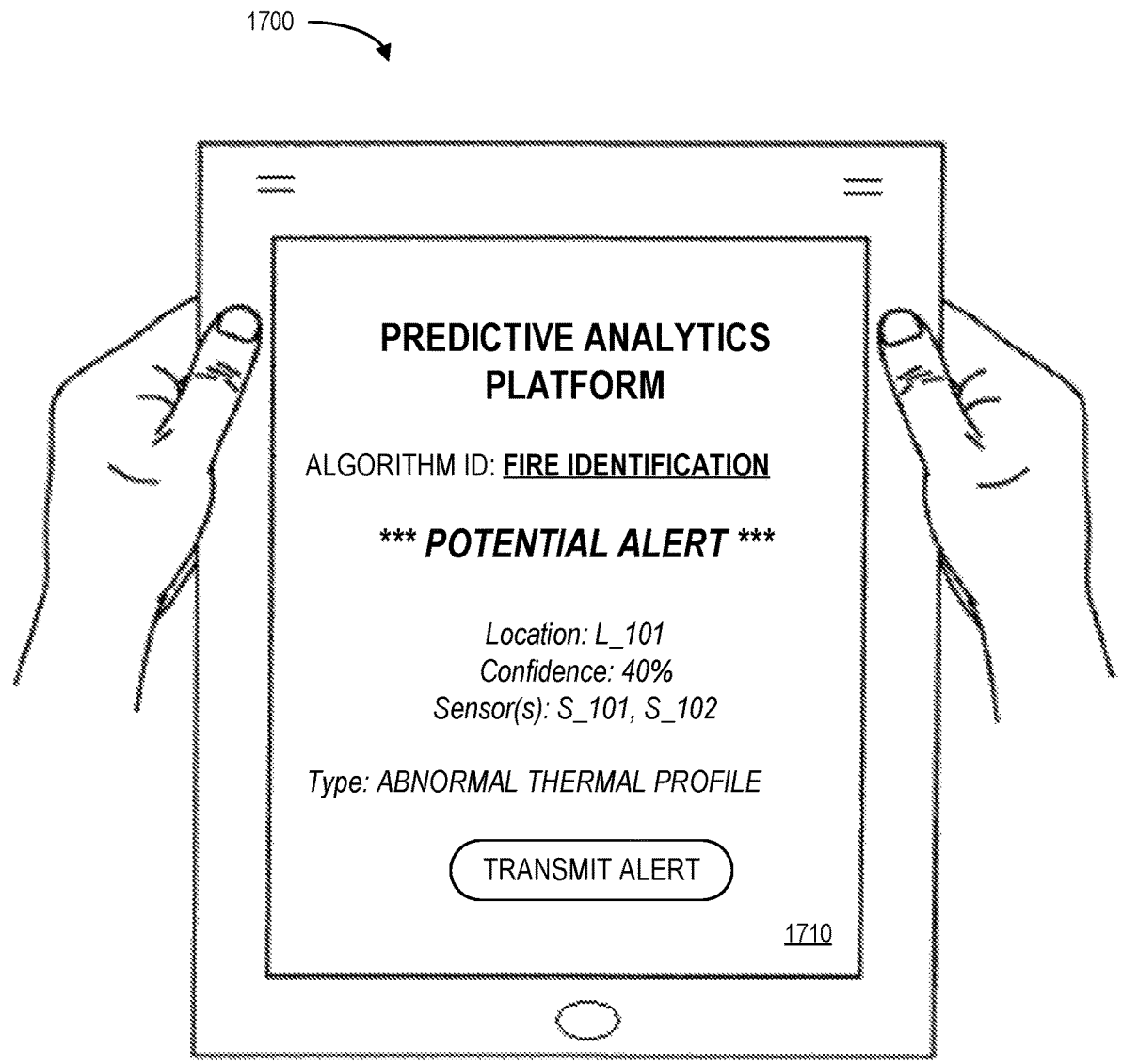
FIG. 17 illustrates a tablet computer displaying an algorithm deployment user interface according to some embodiments.

Although specific hardware and data configurations have been described herein, note that any number of other configurations may be provided in accordance with embodiments of the present invention (e.g., some of the information associated with sensors being monitored and/or loss events might be implemented as an augmented reality display and/or the databases described herein may be combined or stored in external systems). Moreover, although embodiments have been described with respect to specific types of damage, embodiments may instead be associated with other types of remote site protection. For example, embodiments might be used in connection with snowfall damage (e.g., by measuring roof stress), hail damage, wind damage, etc. Still further, the displays and devices illustrated herein are only provided as examples, and embodiments may be associated with any other types of user interfaces. For example, FIG. 17 illustrates a handheld tablet computer 1700 with an alert display 1710 according to some embodiments. According to some embodiments, elements of the display 1710 are selectable (e.g., via a touchscreen) transmit an alert message and/or to adjust or see more information about a particular element. According to some embodiments, the display 1710 may include map information pinpointing the exact location of an event.

Figure 18:
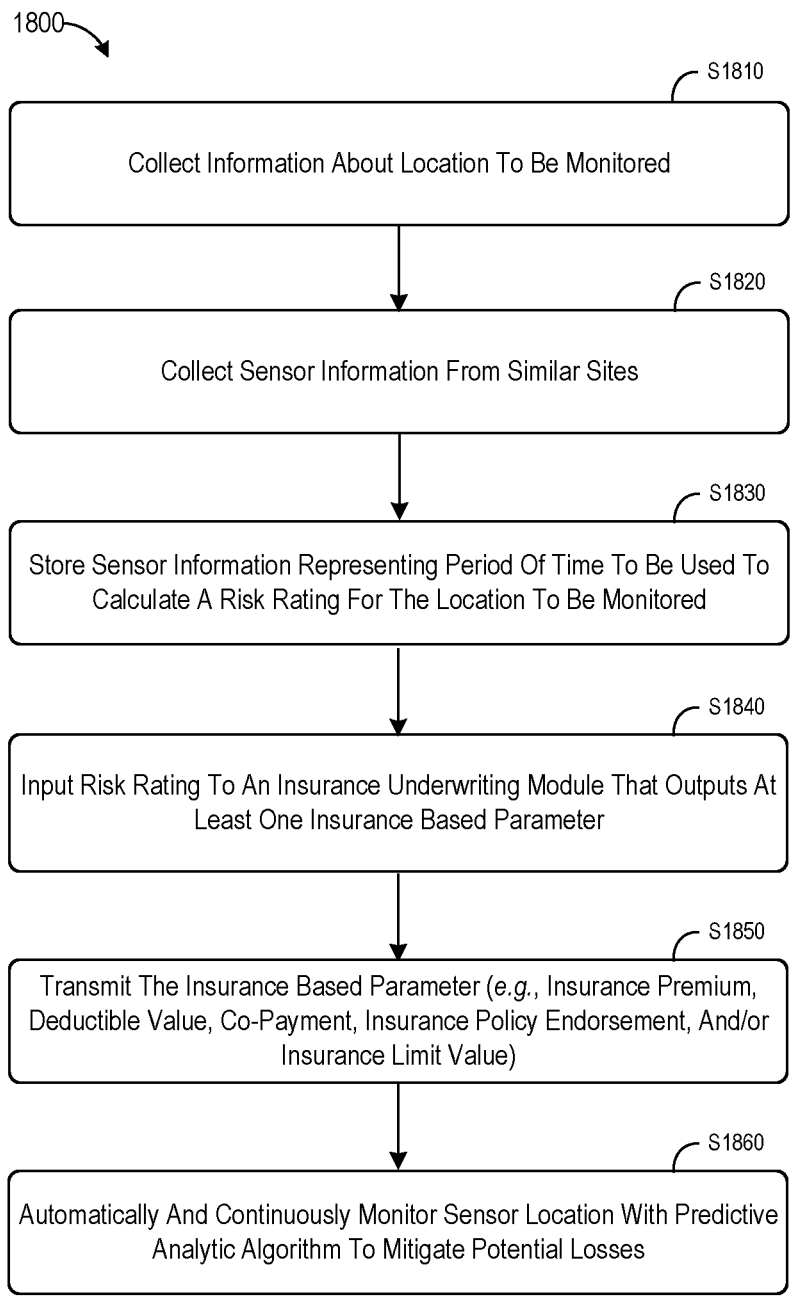
FIG. 18 is business flow incorporating predictive risk analytics for an enterprise in accordance with some embodiments.

Embodiments may be associated with various types of enterprises, including, for example, an insurance company. For example, FIG. 18 is business flow 1800 incorporating predictive risk analytics for an insurance company in accordance with some embodiments. At S1810, information about a location to be monitored is collected. For example, the system might collect sensor data, including sensor location, sensor model number, sensor output data formats, etc. At S1820, sensor information from similar sites may be collected. For example, an insurance company might import historical data from sites with similar businesses, building types, sensors, equipment, etc. At S1830, sensor information representing a period of time to be used to calculate is risk rating may be stored. The period of time might be associated with, for example, the last five minutes, twenty-four hours, year, etc. At S1840, the system may input a risk rate to an insurance underwriting model that generates at least one insurance based parameter (e.g., an insurance premium amount or discount, an insurance deductible, etc.). At S1850, the insurance parameter may be automatically transmitted (e.g., to a customer, underwriter, etc.). At S1860, the system may automatically and continuously monitor sensor locations with one or more predictive analytic algorithms to mitigate potential losses.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system to facilitate predictive risk analytics for an enterprise, comprising:
    (a) a risk monitoring data store containing a set of electronic data records, each electronic data record being associated with a stream of sensor data received via a first communication network from a risk monitoring site;
    (b) a risk analytics platform computer, coupled to the risk monitoring data store, the risk analytics platform computer including a processor and a memory in communication with the processor and storing program instructions for controlling the processor;
    (c) a risk operations platform which includes a thresholding process;
    (d) a set of sensor systems at the risk monitoring site, the set of sensors including a static sensor; and
    (e) a second communication network interconnecting the risk monitoring data store with the risk analytics platform computer;
    wherein the risk analytics platform computer is programmed to:
        (i) receive information associated with the sensor data in substantially real-time,
        (ii) analyze the received sensor data, using at least one risk analytics algorithm, to detect an abnormal pattern associated with a water-damage condition and a fire condition at the risk monitoring site,
        (iii) adjust the at least one risk analytics algorithm based on feedback information to improve performance of the at least one risk analytics algorithm;
        (iv) automatically transmit a result of the analysis to the risk operations platform, thereby triggering an active adjustment at the risk monitoring site responsive to the result of the analysis to automatically mitigate the water-damage condition; and
        (v) analyze results of predictive analytic algorithms to reduce a number of algorithms processed in the second communication network and to reduce usage of communication links in the system;
    wherein said analyzing by the risk analytics platform computer is performed remotely from the risk monitoring site;
    wherein:
        the stream of sensor data is associated with a physical damage sensor device including: (i) a water sensor, (ii) a moisture sensor, and (iii) a vapor sensor; and
        the sensor systems including a mobile robotic sensor, the mobile robotic sensor operating to monitor conditions at a first location, to generate and transmit data representative of the conditions at the first location, to move from the first location to a second location different from the first location, to monitor conditions at the second location, and to generate and transmit data representative of the conditions at the second location.

2. The system of claim 1, wherein the risk monitoring data store further contains at least one of: (i) historical data, (ii) derived analytic elements, (iii) a streaming architecture, (iv) Internet of Things ("IoT") data, (v) information about other risk monitoring sites, (vi) third-party data, and (vii) enterprise transactional system information.

3. The system of claim 1, wherein the risk analytics platform computer is further programed to: (i) execute pattern matching, (ii) incorporate a machine learning process, (iii) incorporate an artificial intelligence process, and (iv) automatically adjust the risk analytics algorithm.

4. The system of claim 1, wherein the stream of sensor data is associated with a security sensor device including at least one of: (i) an acoustic sensor, (ii) a broken glass detection sensor, (iii) a thermal sensor, (iv) a visual light sensor, (v) an infrared sensor, (vi) a motion sensor, and (vii) a sonar sensor.

5. The system of claim 1, wherein the stream of sensor data is associated with a movement sensor device including at least one of: (i) a vibration sensor, and (ii) an accelerometer sensor.

6. The system of claim 1, wherein the stream of sensor data is associated with a positioning sensor device including at least one of: (i) a gyroscope, (ii) a Global Positioning System ("GPS") satellite sensor, and (iii) a magnetic sensor.

7. The system of claim 1, wherein the stream of sensor data is associated with an environmental sensor device including at least one of: (i) a temperature sensor, (ii) a particulate sensor, (iii) a radioactivity sensor, and (iv) a voltage sensor.

8. A computerized method to facilitate predictive risk analytics for an enterprise, comprising:
 receiving, at a risk analytics platform computer from a risk monitoring data store via a communication network, information associated with a stream of sensor data generated by a remote set of sensor systems located at a risk monitoring site, the risk analytics platform including a processor and a memory in communication with the processor, the memory storing program instructions for controlling the processor, the set of sensor systems including a static sensor;
 analyzing the received sensor data, using at least one risk analytics algorithm, to detect an abnormal pattern associated with a water-damage condition and a fire condition at the risk monitoring site, the at least one risk analytics algorithm being adjusted based on feedback information to improve performance of the at least one risk analytics algorithm, said analyzing being performed remotely from the risk monitoring site;
 automatically transmitting a result of the analysis to a risk operations platform, thereby triggering an active adjustment at the risk monitoring site responsive to the result of the analysis to automatically mitigate the water-damage condition, the risk operations platform including a thresholding process;
 analyzing results of predictive analytic algorithms to reduce a number of algorithms processed in the communication network and to reduce usage of communication links in a system that includes the risk analytics platform computer and the risk monitoring data store; and
 operating a mobile robotic sensor to monitor conditions at a first location, to generate and transmit data representative of the conditions at the first location, to move from the first location to a second location different from the first location, to monitor conditions at the second location, and to generate and transmit data representative of the conditions at the second location;
 wherein the stream of sensor data is associated with a physical damage sensor device including: (i) a water sensor, (ii) a moisture sensor, and (iii) a vapor sensor.

9. The method of claim 8, wherein the risk monitoring data store further contains at least one of: (i) historical data, (ii) derived analytic elements, (iii) a streaming architecture, (iv) Internet of Things ("IoT") data, (v) information about other risk monitoring sites, (vi) third-party data, and (vii) enterprise transactional method information.

10. The method of claim 8, wherein the risk analytics platform computer is further programed to: (i) execute pattern matching, (ii) incorporate a machine learning process, (iii) incorporate an artificial intelligence process, and (iv) automatically adjust the risk analytics algorithm.

11. The method of claim 8, wherein the stream of sensor data is associated with at least one of: (i) a security sensor device, (ii) a movement sensor device, (iii) a physical damage sensor device, (iv) a positioning sensor device, and (v) an environmental sensor device.

12. A system to facilitate predictive risk analytics for an enterprise, comprising:
 (a) a risk monitoring data store containing a set of electronic data records, each electronic data record being associated with a stream of sensor data received via a first communication network from a remote set of sensor systems located at a risk monitoring site;
 (b) a risk analytics platform computer, coupled to the risk monitoring data store, the risk analytics platform computer including a processor and a memory in communication with the processor and storing program instructions for controlling the processor, the risk analytics platform computer programmed to:
  (i) receive information associated with the sensor data in substantially real-time,
  (ii) analyze the received sensor data, using at least one risk analytics algorithm, to detect an abnormal pattern associated with a water-damage condition and a fire condition at the risk monitoring site, the at least one risk analytics algorithm being adjusted based on feedback information to improve performance of the at least one risk analytics algorithm, and
  (iii) automatically transmit a result of the analysis to a risk operations platform;
 (c) the risk operations platform, wherein the risk operations platform is programmed to implement an active adjustment at the risk monitoring site responsive to the result of the analysis to automatically mitigate the water-damage condition and further wherein the risk operations platform includes a thresholding process;
 (d) the set of sensor systems at the risk monitoring site, including a static sensor; and
 (e) a second communication network interconnecting the risk monitoring data store with the risk analytics platform computer;
 the risk analytics platform computer further programmed to analyze results of predictive analytic algorithms to reduce a number of algorithms processed in the second communication network and to reduce usage of communication links in the system;
 the set of sensor systems including a mobile robotic sensor that is operated to monitor conditions at a first location, to generate and transmit data representative of the conditions at the first location, to move from the first location to a second location different from the first location, to monitor conditions at the second location, and to generate and transmit data representative of the conditions at the second location;
 wherein:
  said analyzing by the risk analytics platform computer is performed remotely from the risk monitoring site;
  the stream of sensor data is associated with a physical damage sensor device including: (i) a water sensor, (ii) a moisture sensor, and (iii) a vapor sensor.

13. The system of claim 12, wherein the risk monitoring data store further contains at least one of: (i) historical data, (ii) derived analytic elements, (iii) a streaming architecture, (iv) Internet of Things ("IoT") data, (v) information about other risk monitoring sites, (vi) third-party data, and (vii) enterprise transactional system information.

14. The system of claim 12, wherein the risk analytics platform computer is further programed to: (i) execute pattern matching, (ii) incorporate a machine learning process, (iii) incorporate an artificial intelligence process, and (iv) automatically adjust the risk analytics algorithm.

* * * * *